(12) United States Patent
Pang

(10) Patent No.: US 11,900,855 B2
(45) Date of Patent: Feb. 13, 2024

(54) DISPLAY APPARATUS

(71) Applicant: Hisense Visual Technology Co., Ltd., Shandong (CN)

(72) Inventor: Zhenhua Pang, Shandong (CN)

(73) Assignee: HISENSE VISUAL TECHNOLOGY CO., LTD., Shandong (CN)

( * ) Notice: Subject to any disclaimer, the term of this patent is extended or adjusted under 35 U.S.C. 154(b) by 11 days.

(21) Appl. No.: 17/660,395

(22) Filed: Apr. 22, 2022

(65) Prior Publication Data

US 2022/0246084 A1 Aug. 4, 2022

Related U.S. Application Data

(63) Continuation of application No. PCT/CN2020/076417, filed on Feb. 24, 2020.

(30) Foreign Application Priority Data

Nov. 4, 2019 (CN) .......................... 201911067969.X
Nov. 4, 2019 (CN) .......................... 201911067970.2
(Continued)

(51) Int. Cl.
*G09G 3/20* (2006.01)
*H02M 1/44* (2007.01)
(Continued)

(52) U.S. Cl.
CPC ............ *G09G 3/2092* (2013.01); *H02M 1/44* (2013.01); *H02M 7/003* (2013.01); *H02M 7/217* (2013.01);
(Continued)

(58) Field of Classification Search
CPC .. H04R 3/007; H04R 2499/15; G09G 3/2092; G09G 2330/024; G09G 2330/045; H02M 1/44; H02M 7/217
See application file for complete search history.

(56) References Cited

U.S. PATENT DOCUMENTS 5,274,543 A 12/1993 Loftus, Jr.
5,828,353 A 10/1998 Kishi et al.
(Continued)

FOREIGN PATENT DOCUMENTS

CN 101854126 A 10/2010
CN 101997434 A 3/2011
(Continued)

OTHER PUBLICATIONS

International Search Report, dated Jul. 28, 2020, from PCT/CN2020/076417 filed Feb. 24, 2020.

*Primary Examiner* — Doon Y Chow
(74) *Attorney, Agent, or Firm* — Workman Nydegger

(57) ABSTRACT

A display apparatus and a compensation circuit are provided. The display apparatus includes a display screen, a sound reproduction device and a power supply circuit. The power supply circuit includes a rectifier circuit and a compensation circuit. The rectifier circuit is used to convert an alternating current to a direct current. The compensation circuit is used to compensate for a parasitic signal of a synchronous rectification MOSFET in the rectifier circuit, thereby reducing heat generated by the MOSFET.

7 Claims, 19 Drawing Sheets

(30) Foreign Application Priority Data

Nov. 25, 2019 (CN) .......................... 201911167121.4
Dec. 2, 2019 (CN) .......................... 201911212344.8

(51) Int. Cl.
*H02M 7/00* (2006.01)
*H02M 7/217* (2006.01)
*H04R 3/00* (2006.01)

(52) U.S. Cl.
CPC ....... *H04R 3/007* (2013.01); *G09G 2330/024* (2013.01); *G09G 2330/045* (2013.01); *G09G 2330/06* (2013.01); *H04R 2499/15* (2013.01)

(56) References Cited

U.S. PATENT DOCUMENTS

| | | | |
|---|---|---|---|
| 6,128,206 A | 10/2000 | Sun et al. | |
| 10,830,799 B1* | 11/2020 | Lee | ........................ G01R 19/32 |
| 2009/0102541 A1 | 4/2009 | Lopez et al. | |
| 2010/0244941 A1* | 9/2010 | Stuler | ..................... H02M 1/34 |
| | | | 327/543 |
| 2013/0194845 A1* | 8/2013 | Bianco | .................. H02M 7/217 |
| | | | 363/90 |
| 2016/0049876 A1 | 2/2016 | Lee et al. | |
| 2019/0081547 A1 | 3/2019 | Yu et al. | |

FOREIGN PATENT DOCUMENTS

| | | | | |
|---|---|---|---|---|
| CN | 101997438 A | 3/2011 | | |
| CN | 203883693 | * 10/2014 | ............. | F27B 3/085 |
| CN | 203883693 U | 10/2014 | | |
| CN | 106160424 A | 11/2016 | | |
| CN | 106160451 A | 11/2016 | | |
| CN | 206086164 U | 4/2017 | | |
| CN | 107046368 A | 8/2017 | | |
| CN | 108847774 A | 11/2018 | | |
| CN | 109194098 A | 1/2019 | | |
| CN | 109995236 A | 7/2019 | | |

\* cited by examiner

DISPLAY APPARATUS

The application is a continuation application of International Application No. PCT/CN2020/076417 filed Feb. 24, 2020, which claims the priorities from Chinese Patent Application No. 201911067969.X filed on Nov. 4, 2019, Chinese Patent Application No. 201911067970.2 filed on Nov. 4, 2019, Chinese Patent Application No. 201911167121.4 filed on Nov. 25, 2019, and Chinese Patent Application No. 201911212344.8 filed on Dec. 2, 2019, which are hereby incorporated by reference in their entirety.

TECHNICAL FIELD

The disclosure relates to electronic technologies, and in particular, to a display apparatus and a compensation circuit.

BACKGROUND

The rectifier circuit in a display apparatus is a circuit that converts alternating current to direct current. In some scenarios, it is necessary to collect a voltage drop across the synchronous rectification MOSFET in the rectifier circuit and use the voltage drop as a threshold for determining whether to trigger the execution of functions of the display apparatus. For example, a Synchronous Rectification (SR) drive chip in the rectifier circuit determines and controls the synchronous rectification MOSFET to be turned on and off according to the voltage drop across the synchronous rectification MOSFET.

However, due to the parasitic inductance on the pins of the synchronous rectification MOSFET of the rectifier circuit, the accuracy of voltage drop collected by the SR drive chip is affected, thereby affecting the timing when the processor controls on and off of the synchronous rectification MOSFET, then causing the serious overall heating of the synchronous rectification MOSFET, and increasing the loss of the synchronous rectification MOSFET.

SUMMARY

An embodiment of the disclosure provides a display apparatus, including: a display screen configured for image display; a sound reproduction device configured to play sound; a power supply circuit configured to provide electric energy to a load of the display apparatus; wherein the power supply circuit includes: a rectifier circuit and a compensation circuit; wherein the rectifier circuit is configured to convert alternating current into direct current; the compensation circuit is configured to compensate a parasitic signal of a synchronous rectification MOSFET in the rectifier circuit.

In some embodiments, the rectifier circuit includes: a closed loop, where the closed loop includes a secondary coil, the synchronous rectification MOSFET and a load; the compensation circuit includes: an electromagnetic induction coil placed in the closed loop of the rectifier circuit; the electromagnetic induction coil is configured to generate a compensation signal based on a closed loop current in the closed loop, wherein the compensation signal is used to compensate the parasitic signal of the synchronous rectification MOSFET in the rectifier circuit.

In some embodiments, the display apparatus further includes: a controller configured to control the synchronous rectification MOSFET; a source of the synchronous rectification MOSFET is connected with the secondary coil and a first terminal of the electromagnetic induction coil, a drain of the synchronous rectification MOSFET is connected with the load and the controller respectively; and a second terminal of the electromagnetic induction coil is connected with the controller; the electromagnetic induction coil is specifically configured to generate a compensation signal between the first terminal and the second terminal based on the closed loop current in the closed loop; the controller is configured to generate a control signal for controlling the synchronous rectification MOSFET according to a voltage between the second terminal of the electromagnetic induction coil and the drain of the synchronous rectification MOSFET.

In some embodiments, the display apparatus further includes: a controller configured to control the synchronous rectification MOSFET; a source of the synchronous rectification MOSFET is connected with the secondary coil and a first terminal of the electromagnetic induction coil, a drain of the synchronous rectification MOSFET is connected with the load and the controller; and a second terminal of the electromagnetic induction coil is connected with the controller; the electromagnetic induction coil is configured to generate a compensation signal between the first terminal and the second terminal based on the closed loop current in the closed loop; the controller is configured to generate a control signal for controlling the synchronous rectification MOSFET according to a voltage between the second terminal of the electromagnetic induction coil and the source of the synchronous rectification MOSFET.

In some embodiments, the controller includes: an SR drive chip; a CS pin of the SR drive chip is connected with the second terminal of the electromagnetic induction coil; a GND pin of the SR drive chip is connected with the drain of the synchronous rectification MOSFET; a DRV pin of the SR drive chip is connected with a gate of the synchronous rectification MOSFET.

In some embodiments, the controller includes: an SR drive chip; a CS pin of the SR drive chip is connected with the source of the synchronous rectification MOSFET; a GND pin of the SR drive chip is connected with the second terminal of the electromagnetic induction coil; a DRV pin of the SR drive chip is connected with a gate of the synchronous rectification MOSFET.

In some embodiments, the controller is further configured to: in response to the control signal sent from the SR drive chip to the gate of the synchronous rectification MOSFET being a low-level signal, cause a turning-off between the source and the drain of the synchronous rectification MOSFET; in response to the control signal sent from the SR drive chip to the gate of the synchronous rectification MOSFET being a high-level signal, cause a turning-on between the source and the drain of the synchronous rectification MOSFET.

In some embodiments, the electromagnetic induction coil includes at least one winding of wire.

In some embodiments, the rectifier circuit and the compensation circuit are arranged on a single-sided PCB; the electromagnetic induction coil is a piece of wire connecting between a pin of the controller and a pin of the synchronous rectification MOSFET.

In some embodiments, the parasitic signal is generated by a parasitic inductance of a pin of the synchronous rectification MOSFET.

In some embodiments, the parasitic signal and the compensation signal are voltage signals.

An embodiment of the disclosure further provides a compensation circuit for compensating a parasitic signal of a synchronous rectification MOSFET in a rectifier circuit that includes: a closed loop including a secondary coil, the synchronous rectification MOSFET and a load; where the compensation circuit includes: an electromagnetic induction coil placed in the closed loop and configured to generate a compensation signal based on a closed loop current in the closed loop.

An embodiment of the disclosure further provide a display apparatus, including: a first display screen configured for image display; a second display screen configured for image display; a sound reproduction device configured to play sound; a power supply circuit configured to provide electric energy to a load of the display apparatus; the power supply circuit includes: a rectifier circuit and a compensation circuit; where the rectifier circuit is configured to convert alternating current into direct current; and the rectifier circuit includes: a closed loop including a secondary coil, a synchronous rectification MOSFET and a load; the compensation circuit includes: an electromagnetic induction coil placed in the closed loop of the rectifier circuit; the electromagnetic induction coil is configured to generate a compensation signal based on a closed loop current in the closed loop, wherein the compensation signal is used to compensate the parasitic signal of the synchronous rectification MOSFET in the rectifier circuit.

An embodiment of the disclosure further provide a display apparatus, including: a display screen configured for image display; a sound reproduction device configured to play sound; a power supply circuit configured to provide electric energy to a load of the display apparatus; the power supply circuit includes: a rectifier circuit and a control circuit; wherein the rectifier circuit is configured to convert alternating current into direct current; the control circuit includes: a switch transistor and a controller; the switch transistor is connected in parallel with a synchronous rectification MOSFET in the rectifier circuit; the controller is configured to control the synchronous rectification MOSFET in the rectifier circuit according to a voltage across the switch transistor.

In some embodiments of the disclosure, a parasitic inductance of a pin of the switch transistor is smaller than a parasitic inductance of a pin of the synchronous rectification MOSFET.

In some embodiments of the disclosure, the rectifier circuit includes: a secondary coil and the synchronous rectification MOSFET, wherein a source of the synchronous rectification MOSFET is connected with the secondary coil, and a drain of the synchronous rectification MOSFET is connected with a load; a first terminal of the switch transistor is connected with the secondary coil, a second terminal of the switch transistor is connected with the load, and a third terminal of the switch transistor is connected with the controller; the controller is connected with a gate of the synchronous rectification MOSFET, and the first, second and third terminals of the switch transistor; the controller is configured to generate a control signal through a voltage between the first and second terminals of the switch transistor, and send the control signal to the synchronous rectification MOSFET and the switch transistor; wherein the control signal is used to control the synchronous rectification MOSFET and the switch transistor.

In some embodiments of the disclosure, the control signal is used to control the synchronous rectification MOSFET and the switch transistor to turn on or turn off simultaneously.

In some embodiments of the disclosure, the switch transistor is an MOSFET; wherein the first terminal of the switch transistor is a source of the MOSFET, the second terminal of the switch transistor is a drain of the MOSFET, and the third terminal of the switch transistor is a gate of the MOSFET.

In some embodiments of the disclosure, the controller includes a synchronous rectification SR drive chip; a CS pin of the SR drive chip is connected with the first terminal of the switch transistor; a GND pin of the SR drive chip is connected with the second terminal of the switch transistor; a DRV pin of the SR drive chip is connected with the gate of the synchronous rectification MOSFET and the gate of the switch transistor.

In some embodiments of the disclosure, the controller is further configured to: in response to the control signal being a low-level signal, cause the synchronous rectification MOSFET and the switch transistor to be turned off; in response to the control signal being a high-level signal, cause the synchronous rectification MOSFET and the switch transistor to be turned on.

In some embodiments of the disclosure, an internal resistance of the switch transistor is greater than an internal resistance of the synchronous rectification MOSFET.

Some embodiments of the disclosure provide a control circuit for controlling a synchronous rectification MOSTET in a rectifier circuit that includes: the synchronous rectification MOSFET; the control circuit includes: a switch transistor and a controller; the switch transistor is connected in parallel with a synchronous rectification MOSFET in the rectifier circuit; the controller is configured to control the synchronous rectification MOSFET in the rectifier circuit according to a voltage across the switch transistor.

Some embodiments of the disclosure provide a display apparatus, including: a first display screen configured to display a first image picture; a second display screen configured to display a second image picture; a sound reproduction device configured to play sound; a power supply circuit configured to provide electric energy to a load of the display apparatus; the power supply circuit includes: a rectifier circuit and a compensation circuit; the power supply circuit includes: a rectifier circuit and a control circuit; wherein the rectifier circuit is configured to convert alternating current into direct current; the control circuit includes: a switch transistor and a controller; the switch transistor is connected in parallel with a synchronous rectification MOSFET in the rectifier circuit; the controller is configured to control the synchronous rectification MOSFET in the rectifier circuit according to a voltage across the switch transistor.

DETAILED DESCRIPTION

Figure 1:
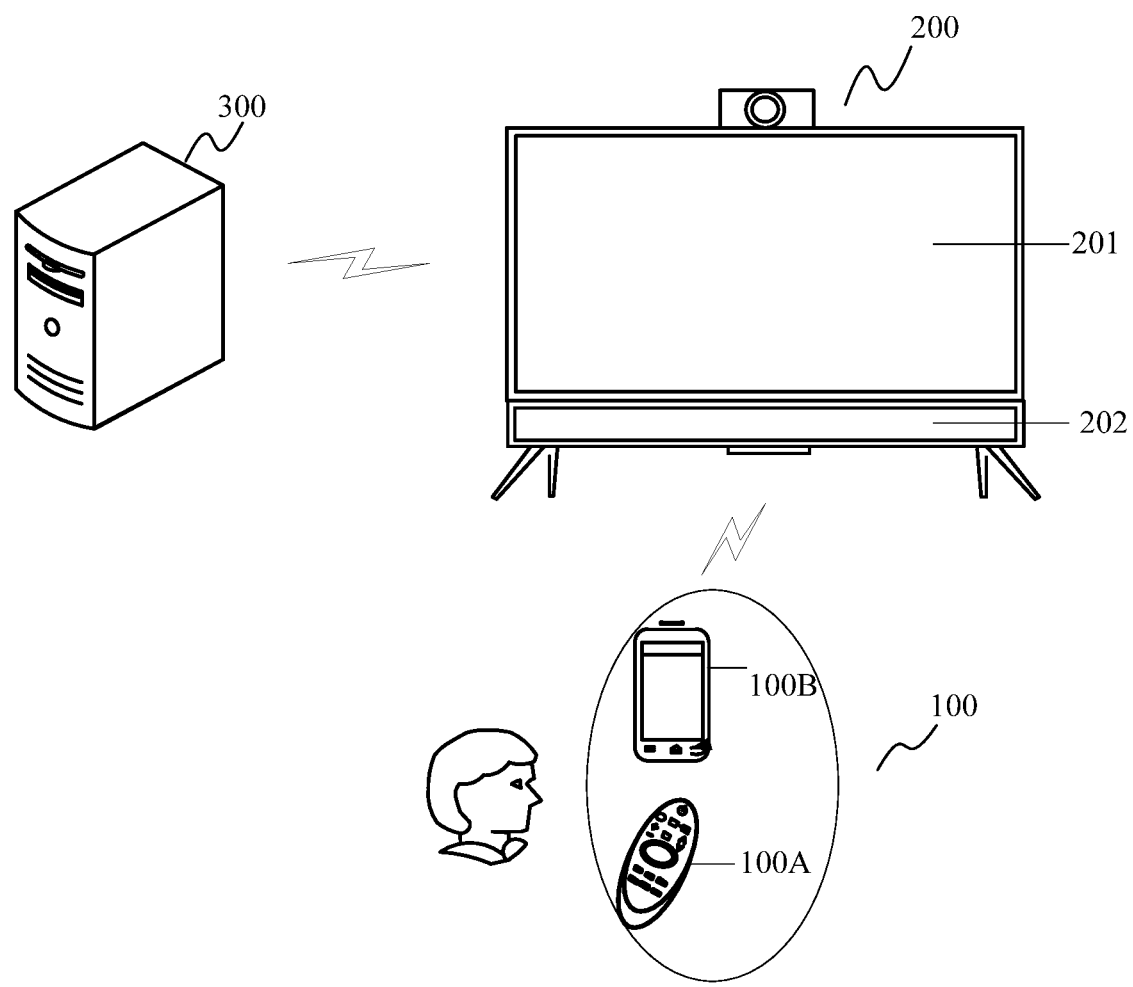
FIG. 1 shows a schematic diagram of an operation scenario between a display apparatus and a control device according to an embodiment.

In order to make the purposes, embodiments and advantages of the disclosure clearer, the embodiments of the disclosure will be described clearly and completely below in combination with the accompanying drawings in embodiments of the disclosure. Obviously the described embodiments are only some but not all the embodiments. Based upon embodiments of the disclosure, all of other embodiments obtained by those ordinary skilled in the art without creative work shall fall within the protection scope of the disclosure.

The terms "first", "second", "third", "fourth" and others (if any) in the specification and claims as well as the above drawings in the disclosure are used to distinguish the similar objects, but not necessarily indicate a particular order or sequence.

The display apparatus provided in embodiments of the disclosure may have a single system and a single display screen. For example, the display apparatus includes: a display screen configured for image display; a sound reproduction device configured to play sound; and a power supply circuit configured to supply power to loads of the display apparatus, where the loads include the display screen and the sound reproduction device.

Alternatively, the display apparatus according to embodiments of the disclosure may also have two systems and two display screens. That is, the display apparatus has a first controller (a first hardware system, chip A), a second controller (a second hardware system, chip N), a first display screen and a second display screen of which the audios and videos are processed synchronously. The structure, functions, implementation modes and other aspects of a display apparatus with a two system hardware structure will be illustrated below in details.

For the convenience of users, various input/output interfaces are usually provided on the display apparatus to facilitate the connection with different peripheral devices or cables to achieve corresponding functions. In a case where an external high-definition camera is connected to the display apparatus, if no hardware interface for receiving the source codes of the high-pixel camera is provided in the hardware system of the display apparatus, then the data received from the camera cannot be presented on the display screen of the display apparatus.

In addition, due to the hardware structure, the hardware system of the traditional display apparatus only supports one stream of hard decoding resource, and can usually only supports the decoding of at most 4K resolution video. Therefore, when one wants to perform the video chat while watching the Internet TV, in order not to reduce the definition of the network video images, the hard decoding resource (usually, the GPU in the hardware system) is used to decode the network video. However, in this case, the general-purpose processor (such as CPU) in the hardware system can only be used to process the video chat image by soft decoding the video.

The soft decoding process of the video chat images will greatly increase the data processing burden of the CPU. When the data processing burden of the CPU is too high, the image may freeze or become unsmooth. Further, due to the data processing capability of the CPU, when the video chat images is processed by CPU through soft decoding, it is usually impossible to realize multi-channel video calls. When a user wants to chat with other users simultaneously by video calls in the same chat scenario, the access is easily blocked.

In view of the above issues, embodiments of the disclosure disclose a two hardware system architecture to support multiple video calls (at least one local video).

FIG. 1 shows a schematic diagram of a scenario between a display apparatus and a control device in an embodiment. As shown in FIG. 1, a user can operate a display apparatus 200 through a control device 100.

Here, the control device 100 may be a remote controller, which includes the infrared protocol communication or Bluetooth protocol communication and other short-range communication methods, etc., and controls the display apparatus 200 wirelessly or by other wired methods. The user may input user commands through the keys on the remote controller, voice inputs, control panel inputs, etc. to control the display apparatus 200.

The control device 100 can also be a smart device, for example, a mobile terminal 100B, a tablet computer, a computer, a notebook computer, etc, and can be communicated with the display apparatus 200 through a local area network (LAN), a wide area network (WAN), a wireless local area network (WLAN) or other networks, and can control the display apparatus 200 through an application corresponding to the display apparatus 200. For example, the display apparatus 200 can be controlled through an application running on a smart device. The application can provide various controls for the user on a screen related to a smart device through an intuitive user interface (UI).

Exemplarily, both the mobile terminal 100B and the display apparatus 200 can install software applications, and implement the connection and communication through the network communication protocols, achieving the purpose of one-to-one control operation and data communication.

As shown in FIG. 1, the display apparatus 200 further performs the data communication with a server 300 through various communication methods. The display apparatus 200 may be allowed to perform the communication and connection through a Local Area Network (LAN), a Wireless Local Area Network (WLAN), and other networks. The server 300 may provide various contents and interactions to the display apparatus 200.

Exemplarily, the display apparatus 200 receives the software updates by sending and receiving the information and the Electronic Program Guide (EPG) interaction, or accesses a remotely stored digital media library. The server 300 provides the video on demand, advertising service and other network service content.

The display apparatus 200 includes a first display screen 201 and a second display screen 202. The first display screen 201 and the second display screen 202 are independent of each other, and two hardware control systems are used between the first display screen 201 and the second display screen 202.

Here, the first display screen 201 and the second display screen 202 can be used for different display. For example, the first display screen 201 can be used for display of traditional television programs, and the second display screen 202 can be used for display of the auxiliary or additional information such as notification message, voice assistant, etc.

In some embodiments, the content displayed on the first display screen 201 and the content displayed on the second display screen 202 may be independent of each other without affecting each other. For example, when the first display screen 201 is playing a television program, the second display screen 202 may display the information such as time, weather, temperature and alert messages that are not related to the television program.

In some embodiments, the content displayed on the first display screen 201 may be associated with the content displayed on the second display screen 202. For example, when the first display screen 201 plays the main screen of the video chat, the second display screen 202 may display the head portrait of the users participating the video chat, the chat duration and other information of the video chat.

In some embodiments, some or all of the content displayed on the second display screen 202 can be displayed on the first display screen 201. For example, the information such as time, weather, temperature and reminder message displayed on the second display screen 202 can be moved to the first display screen 201, while the second display screen 202 can be used to display other information.

In addition, the first display screen 201 also displays an interactive interface which involves multiple parties while displaying the traditional television program. The interactive interface involving multiple parties does not cover the interface of the traditional television program. Here, the disclosure does not limit the display mode of the interface of the traditional television program and the interactive interface. For example, the disclosure can set the positions and sizes of the interface of the traditional television program and the interactive interface according to the presentation priorities of the interface of the traditional television program and the interactive interface involving multiple parties.

As an example, the presentation priority of the interface of the traditional television program is higher than the priority of the interactive interface involving multiple parties, the area of the interface of the traditional television program is larger than the area of the interactive interface involving multiple parties. In some embodiments, the interactive interface can be arranged at one side of the interface of the traditional television program or floating at a corner of the interface of the traditional television program.

On the one hand, the display apparatus 200 may be a liquid crystal display, an OLED display, or a projection display apparatus.

In addition to the broadcast receiving television function, the display apparatus 200 may additionally provide the smart network television function that computer supports. Exemplarily, it includes: network television, smart television, Internet Protocol television (IPTV), etc. In some embodiments, the display apparatus may not be provided with broadcast reception television function.

As shown in FIG. 1, the display apparatus 200 connects with a camera or has a camera, and is configured to present images captured by the camera on the display interface of the display apparatus or another display apparatus, to realize interactions between users. In some embodiments, the images captured by the camera can be displayed in full screen or half screen on the display apparatus, or any optional area.

As an alternative connection, the camera is connected with a rear shell of the display apparatus through a connecting plate, and is fixed on the middle part of the upper side of the rear shell of the display apparatus. As for the installation manner, the camera can be amounted at any position of the rear shell of the display apparatus, as long as an image capture area of the camera is not shielded by the rear shell. For example, the image acquisition area covers the display direction of the display apparatus.

As another alternative connection, the camera is connected with a rear shell of a display apparatus through a connecting plate or other suitable connectors in a way that is able to go up and go down. The connector is provided with a motor for moving up and down, when a user wants to use the camera or when an application wants to invoke the camera, the camera is being moved up above the display, and when the camera is not needed, the camera can be embedded into the rear shell, to protect the camera from being damaged.

As an embodiment, the camera used in the disclosure can be of 16 megapixels, to achieve the purpose of ultrahigh definition display. In implementations, a camera with the pixels being greater than or lower than 16 megapixels can also be adopted.

When the display apparatus has a camera, the contents displayed by the display apparatus in different scenarios can be combined in multiple different ways, to realize functions which cannot achieve by traditional display apparatuses.

In some embodiments, a user may conduct video chat with at least one user while watching a video program. The video program window can be presented as a background, while the window of video chat can be displayed superposing the background. The function can be called as "chatting while watching".

In some embodiments, in "chatting while watching" context, at least one video chat with another terminal is conducted while live video or network video is being watched.

In some embodiments, a user can conduct a video chat with one or more other user while using an education application for learning. For example, a student can realize remote interaction with a teacher while learning via an education application. The function can be called as "chatting while learning".

In some embodiments, while a user is playing a card game, the user is able to have a video chat with other users from the same game. For example, after launching a game application to participate in the game, a player is able to interact with other players remotely. The function can be vividly called as "playing while watching".

In some embodiments, a user can turn on a local camera to have images and videos captured, and the function can be vividly called as "looking in a mirror".

Figure 2:
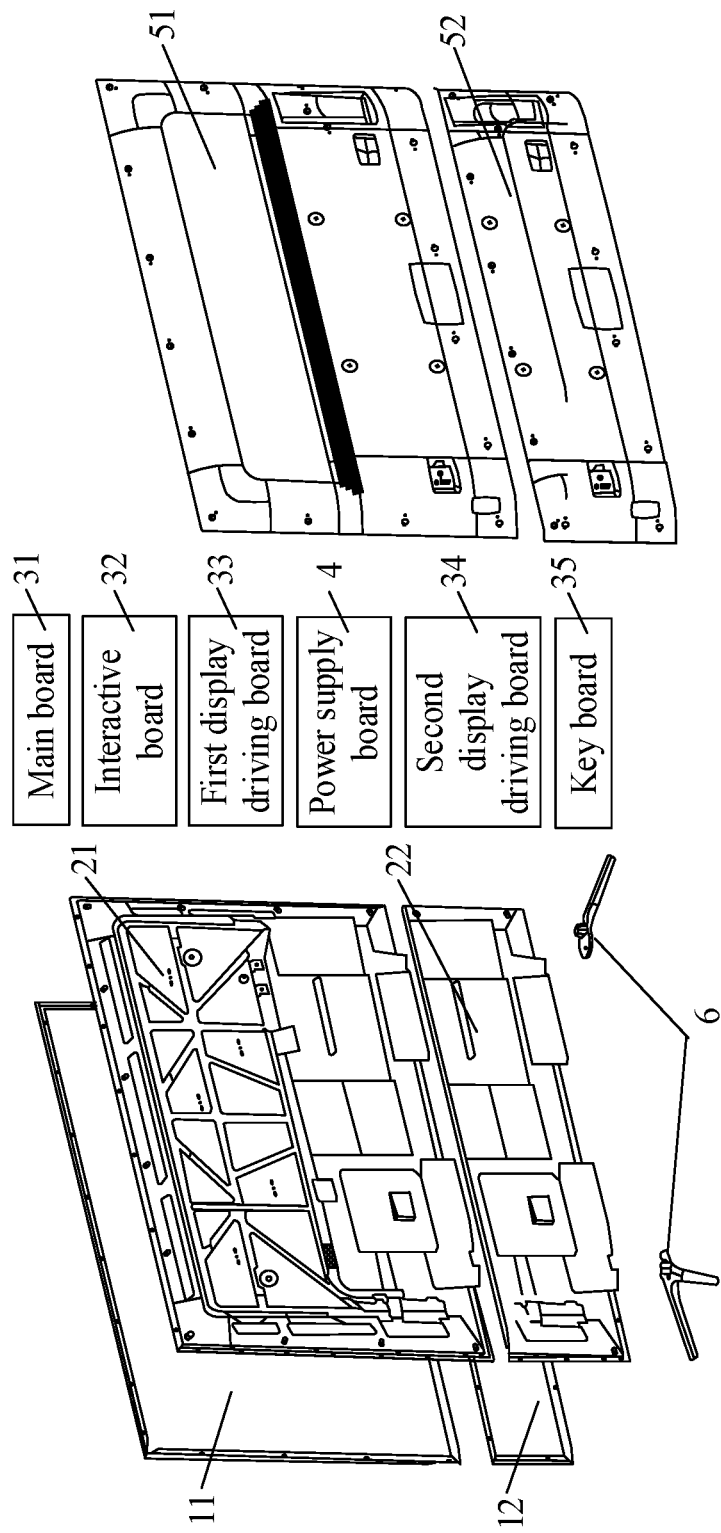
FIG. 2 shows a schematic diagram of the hardware structure of a hardware system in the display apparatus 200 according to an embodiment.

FIG. 2 shows a schematic diagram of the hardware structure of a hardware system in the display apparatus 200 according to an embodiment. For ease of description, the display apparatus 200 in FIG. 2 is a liquid crystal display as an example for illustration.

As shown in FIG. 2, the display apparatus 200 includes: a first panel 11, a first backlight assembly 21, a main board 31, an interactive board 32, a first display driving board 33, a second panel 12, a second backlight assembly 22, a second display driving board 34, a power supply board 4, a first rear shell 51, a second rear shell 52 and a base 6.

Here, the first panel 11 is configured to present an image on the first display screen 201 to a user. The first backlight assembly 21 is located below the first panel 11, and usually includes some optical components for supplying the sufficient brightness and uniformly distributed light sources, to allow the first panel 11 to display normally. The first backlight assembly 21 also includes a first backplane (not shown in the figure). The main board 31, the interactive board 32, the first display driving board 33 and the power supply board 4 are arranged on the first backplane. Usually, some bump structures are usually formed by stamping on the first backplane. The main board 31, the interactive board 32, the first display driving board 33 and the power supply board 4 are fixed on the bump structures by screws or hooks. The main board 31, the interactive board 32, the first display driving board 33 and the power supply board 4 may be arranged on one board together, or may be arranged on different boards respectively. The first rear shell 51 houses the first panel 11 to cover the first backlight assembly 21, the main board 31, the interactive board 32, the first display driving board 33 and the power supply board 4 and other parts of the display apparatus 200, achieving an aesthetic effect.

Here, the main function of the first display driving board 33 is to perform thousand-level backlight partition control through the backlight driving signal (such as a PWM signal and a Local dimming signal) transmitted from the main board 31. This part of control changes according to the image content. The VbyOne display signal sent from the main board 31 is received after establishing a handshake between the first display driving circuit 33 and the main board 31, and the VbyOne display signal is converted into an LVDS signal to realize the image display of the first display screen 201. The base 6 is used to support the display apparatus 200. It should be noted that only one form of base design is shown in this figure, and those skilled in the art can design different forms of bases according to product requirements.

Here, the second panel 12 is used to present an image on the second display screen 202 for a user. The second backlight assembly 22 is located below the second panel 12, and usually includes some optical components for supplying the sufficient brightness and uniformly distributed light sources, to allow the second panel 12 to display normally. The second backlight assembly 22 further includes a second backplane (not shown in the figure). The second display driving board 34 is arranged on the second backplane, and some bump structures are usually stamped on the second backplane. The second display driving board 34 is fixed on the bump structures by screws or hooks. The second rear shell 52 houses the second panel 12 to cover the second backlight assembly 22, the switching drive board 36, the second TCON board 34b and the key board 35 and other parts of the display apparatus 200, achieving an aesthetic effect.

In some embodiments, FIG. 2 also shows a key board 35, which may be arranged on the first backplane or the second backplane, which is not limited in the disclosure.

Furthermore, the display apparatus 200 also includes a sound reproduction device (not shown in the figure), e.g., an audio component, such as I2S interface including a power amplifier (AMP) and a speaker, for realizing the reproduction of sound. Generally, the audio component can achieve at least two channels of sound output. In order to achieve a surrounding sound effect, multiple audio components are required to output multiple channels of sound, which will not be described in detail here.

It should be noted that the display apparatus 200 can also be an OLED display. Accordingly, the boards included in the display apparatus 200 are changed accordingly, which will not be illustrated in detail here.

Figure 3:
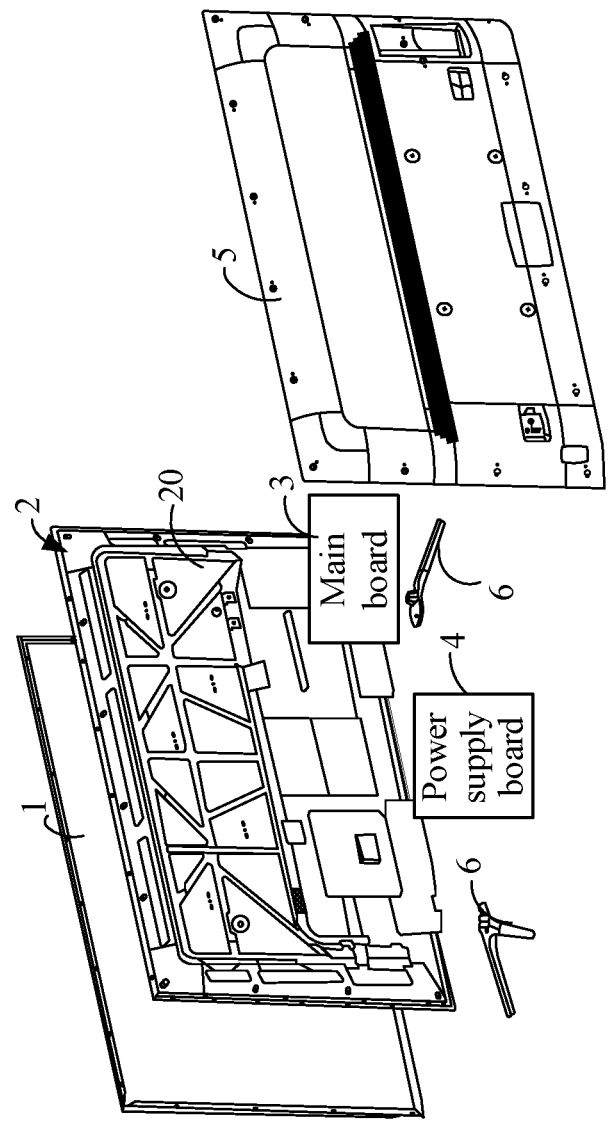
FIG. 3 shows a schematic diagram of the hardware structure of a hardware system in the display apparatus according to an embodiment.

In FIG. 2, the display apparatus with two display screens is taken as an example for illustration, while in FIG. 3 the display apparatus with single display screen is taken as an example for illustration. The display apparatus with a single display screen as shown in FIG. 3 includes: a panel 1, a backlight assembly 2, a main board 3, a power supply board 4, a rear shell 5 and a base 6. Here, the panel 1 is configured to present images for users. The backlight assembly 2 is located below the panel 1 and usually includes some optical components for supplying the sufficient brightness and uniformly distributed light sources to allow the panel 1 to display the images normally. The backlight assembly 2 further includes a backplane 20, where the main board 3 and the power supply board 4 are arranged on the backplane 20. Some bump structures are usually stamped on the backplane 20, and the main board 3 and the power supply board 4 are fixed on the bump structures by screws or hooks. The rear shell 5 houses the panel 1 to cover the backlight assembly 2, the main board 3, the power supply board 4 and other parts of the display apparatus, achieving an aesthetic effect. The base 6 is configured to support the display apparatus.

Figure 4:
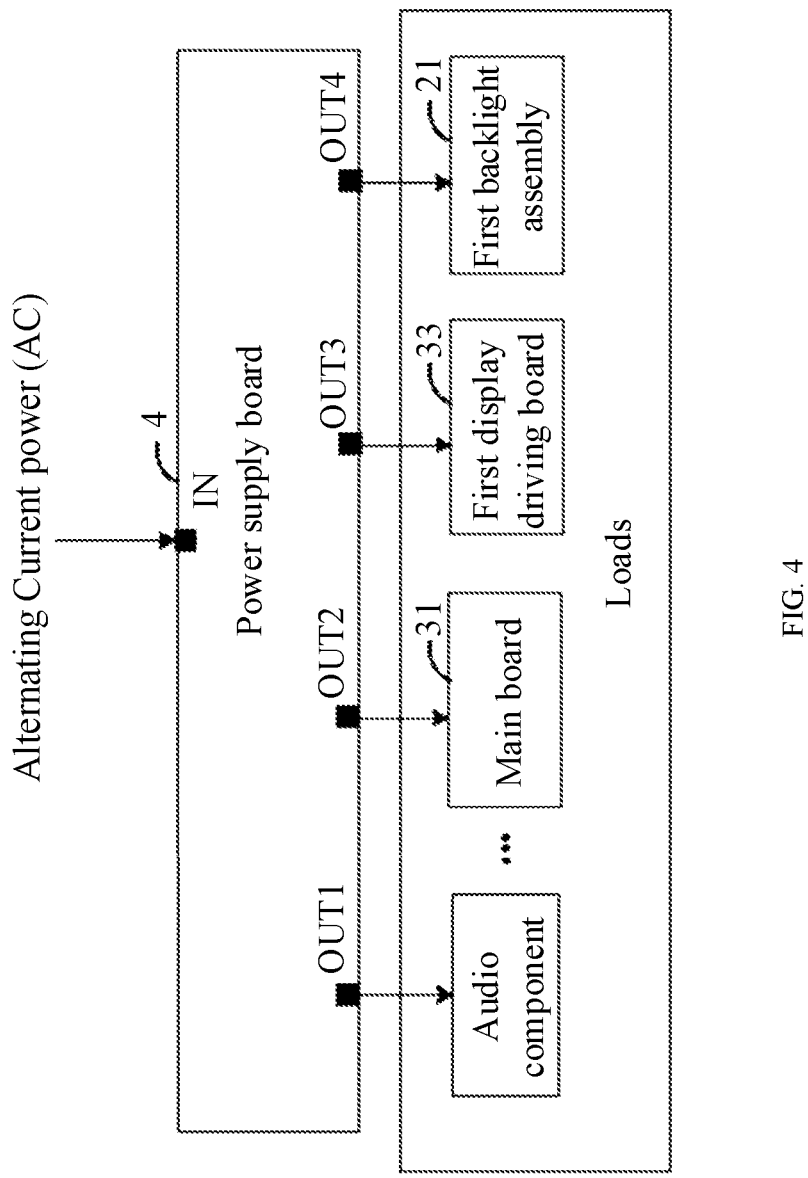
FIG. 4 shows a schematic diagram illustrating the connection relationship between a power supply board and loads.

FIG. 4 shows a schematic diagram of the connection relationship between the power supply board and loads, in a display apparatus with two display screens. The power supply board 4 includes an input terminal IN and an output terminal OUT (a first output terminal OUT1, a second output terminal OUT2, a third output terminal OUT3 and a fourth output terminal OUT4 are shown in the figure). The input terminal IN is connected to the mains supply, and the output terminal OUT is connected to loads. For example, the first output terminal OUT1 is connected to an audio component, the second output terminal OUT2 is connected to the main board 31, the third output terminal OUT3 is connected to the first display driving board 33, and the fourth output terminal OUT4 is connected to the first backlight assembly 21. The power supply board 4 needs to convert the AC power into the DC power required by the loads. The DC power usually has different specifications, for example, 18V required by the audio component, 12V/18V required by the main board 13, and so on.

Figure 5:
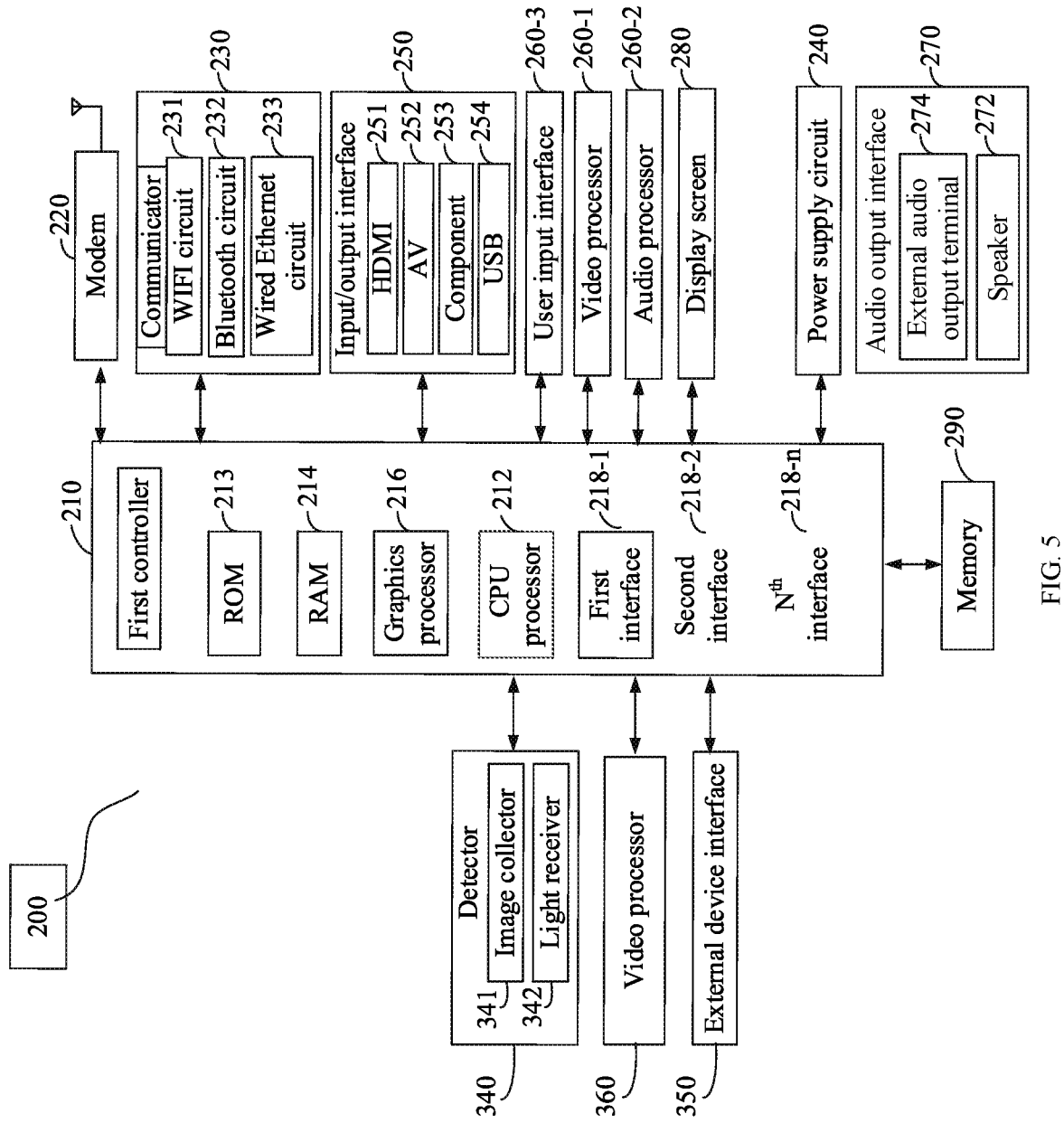
FIG. 5 shows a block diagram of the hardware architecture of the display apparatus 200 shown in FIG. 2 or FIG. 3.

The system architecture of the display apparatus of the disclosure will be further described below with reference to FIG. 5. It should be noted that FIG. 5 is only an illustration and does not represent a limitation to the disclosure. In practical applications, more or less hardware or interfaces may be included as needed.

FIG. 5 shows a block diagram of the hardware architecture of the display apparatus 200 shown in FIG. 2 or FIG. 3. As shown in FIG. 5, the hardware system of the display apparatus 200 includes a controller and circuits connected to the controller through various interfaces.

Here, the controller may be arranged on the interactive board 32 shown in FIG. 2, or arranged on the main board 3 shown in FIG. 3. In some embodiments, the controller may include a modem 220, a communicator 230, an input/output interface 250, a first controller 210, a memory 290, a user input interface 260-3, a video processor 260-1, an audio processor 260-2, a display 280, an audio output interface 270, a power supply circuit 240, a detector 340, an external device interface 350 and a video processor 360. The controller may also include more or less circuits in other embodiments.

Here, the modem 220 receives the broadcast television signals in a wired or wireless manner, and may perform the amplification, frequency mixing, resonance and other modulation/demodulation processing, to demodulate the television audio/video signals carried in the frequency of the television channel selected by the user from multiple wireless or wired broadcast television signals, as well as the EPG data signals. According to different television signal broadcasting formats, the modem 220 may receive signals in many types, such as: terrestrial digital television, cable broadcasting, satellite broadcasting, or Internet broadcasting or the like; according to different modulation types, the digital modulation mode or analog modulation mode may be used; and according to different types of received television signals, the analog signals and digital signals may be used.

The modem 220 may respond to the television signal frequency selected by the user and the television signal carried by the frequency according to the user's selection under the control of the controller 210.

In other some exemplary embodiments, the modem 220 may also be in an external device, such as an external set-top box. In this way, the set-top box outputs television audio/video signals after modulation and demodulation, which are input to the display apparatus 200 through the input/output interface 250.

The communicator 230 is a component in communication with an external device or an external server according to various types of communication protocols. For example: the communicator 230 may be a WiFi chip 231, a Bluetooth communication protocol chip 232, a wired Ethernet communication protocol chip 233, another network communication protocol chip or near-field communication protocol chip, and an infrared receiver (not shown in the figure).

The display apparatus 200 may establish control signals and data signals connection with an external control device or content providing device through the communication interface 230. For example, the communicator may receive the control signal of the remote controller 100 under the control of the controller 210.

The input/output interface 250 transmits the data between the display apparatus 200 and other external devices under the control of the controller 210. The input/output interface 250 may be connected to external devices such as set-top box, game device, laptop, etc. in a wired/wireless manner, and may receive the data such as video signals (e.g., moving images), audio signals (e.g., music), additional information (e.g., EPG), etc. of the external devices.

Here, the input/output interface 250 may include but not limited to: any one or more of a High-Definition Multimedia Interface (HDMI) interface 251, an analog or data high-definition component input interface 253, a composite video input interface 252, a USB input interface 254, and an RGB interface (not shown in the figure), etc. The disclosure does not limit the number and type of input/output interfaces.

The first controller 210 controls the operations of the display apparatus 200 and responds to the user's operations through various software (such as operating system and/or various applications) stored in the memory 290.

As shown in FIG. 5, the controller 210 includes a Read Only Memory (ROM) 213, a Random Access Memory (RAM) 214, a graphics processor 216, a CPU processor 212, a communication interface 218, and a communication bus. The ROM 213, RAM 214, graphics processor 216, CPU processor 212 and communication interface 218 are connected through the bus.

The graphics processor 216 is used to generate various graphics objects, such as icons, operation menus etc. It includes an arithmetic unit, which performs the operations by receiving various interactive instructions input from users, and displays various objects according to the display attributes. And it includes a renderer, which generates the result of rendering various objects obtained based on the arithmetic unit, for displaying on the display screen 280.

In some exemplary embodiments, the CPU processor 212 may include multiple processors. The multiple processors may include a main processor and one or more sub-processors. The main processor is used to perform some operations of the display apparatus 200 in the pre-power-up mode, and/or the operations of the display picture in the normal mode. One or more sub-processors are used to perform an operation in the standby mode or other states.

The communication interface 218 may include a first interface 218-1 to an $n^{th}$ interface 218-n. These interfaces may be network interfaces connected to external devices via a network.

The first controller 210 may control operations of the display apparatus 200 related to the first display screen 280. For example, in response to receiving user commands for selecting the UI objects displayed on the first display screen 280, the first controller 210 will perform operations related to an object selected by a user command. Here the object can be any one of objects available for selection, such as a hyperlink or an icon.

The user input interface 260-3 is used to send signals from a user to the first controller 210, or transmit signals output from the first controller 210 to the user. Exemplarily, the control device (for example, a mobile terminal or a remote controller) can send input signals, such as power on or power off signals, channel selection signals and volume adjustment signals, input from the user to the user input interface 260-3, and then transmit the input signals to the first controller 210 through the user input interface 260-3. Or, the control device can receive output signals such as audios, videos or data processed by the first controller 210 and output through the user input interface 260-3, and display the received output signals or output the signals received in an audio or vibration form.

In some embodiments, the user can input commands to the graphical user interface (GUI) displayed on the first display screen 280, and the user input interface 260-3 receives user input commands through the graphical user interface (GUI). Or, the user can input user commands by inputting voices or gestures, then the user input interface 260-3 receive the user input commands through voices or gestures recognition by a sensor.

The video processor 260-1 is used to receive the video signal and perform the video processing such as decompression, decoding, scaling, noise reduction, frame rate conversion, resolution conversion, and image synthesis according to the standard codec protocol of the input signal, to obtain the signal that can be displayed or played directly on the first display screen 280.

The video decoding circuit is used to process the demultiplexed video signal, including decoding and scaling, etc.

The frame rate conversion circuit is used to convert the frame rate of the input video, e.g., converting the input frame rate of 24 Hz, 25 Hz, 30 Hz, 60 Hz of the video into the output frame rate of 60 Hz, 120 Hz or 240 Hz.

The first display screen 280 is used to receive the image signals input from the video processor 260-1, and display the video content and images as well as the menu control interface. The first display screen 280 includes a display component configured to display images and a driving component configured to drive image display. The displayed video can be videos in the broadcast signals received from modem 220, and can also be video input from the communicator or the external device interface. The first display screen 280 can simultaneously display the user control interface (UI) generated in the display apparatus 200 and configured for controlling the display apparatus 200.

In some embodiments, there are different types of display. The first display screen 280 can further include a driving component for driving display. Or, if the first display screen 280 is a projection display, the first display screen 280 can further include a projection device and a projection screen.

The audio processor 260-2 is used to receive the external audio signal, and perform the processing such as decompression, decoding, noise reduction, digital-to-analog conversion and amplification according to the standard codec protocol of the input signal, to obtain the sound signal that can be played in the speaker 272.

The audio output 270 is used to receive the sound signal output from the audio processor 260-2 under the control of controller 210, such as: a speaker 272; and may include an external audio output terminal 274 for outputting to a sound device of an external device, such as: external audio interface or headphone interface, in addition to the speaker 272 in the display apparatus 200 itself.

In some other exemplary embodiments, the video processor 260-1 may include one or more chips. The audio processor 260-2 may also include one or more chips.

And, in some other exemplary embodiments, the video processor 260-1 and the audio processor 260-2 may be separate chips, or may be integrated into one or more chips together with the first controller 210.

The power supply circuit 240 provides the power supply support for the display apparatus 200 through the power input from an external power supply under the control of the first controller 210. The power supply may include a built-in power supply circuit installed inside the display apparatus 200, or may be a power supply installed outside the display apparatus 200, and a power interface of the external power supply is provided in the display apparatus 200.

The detector 340 is a component for collecting signals about external environment or interactions with outside. The detector 340 can include an optical receiver 342 which is a sensor for collecting ambient light intensity and the display parameters can adapt according to the collected ambient light. Further, the detector 340 can include an image collector 341, such as a camera, a webcam and the like. The image collector 341 is configured to collect external environment scenes, collect user attribute or gestures of the user, so that the display parameters can change accordingly and user gestures can be recognized, to allow the interactions with users.

The external device interface 350 is a component for data transmission between the second controller 310 and the chip N or other external devices. The external device interface may be connected to external devices such as set-top box, a gaming device and a notebook computer in a wired/wireless manner.

The video processor 360 is used to process related video signals.

Figure 6:
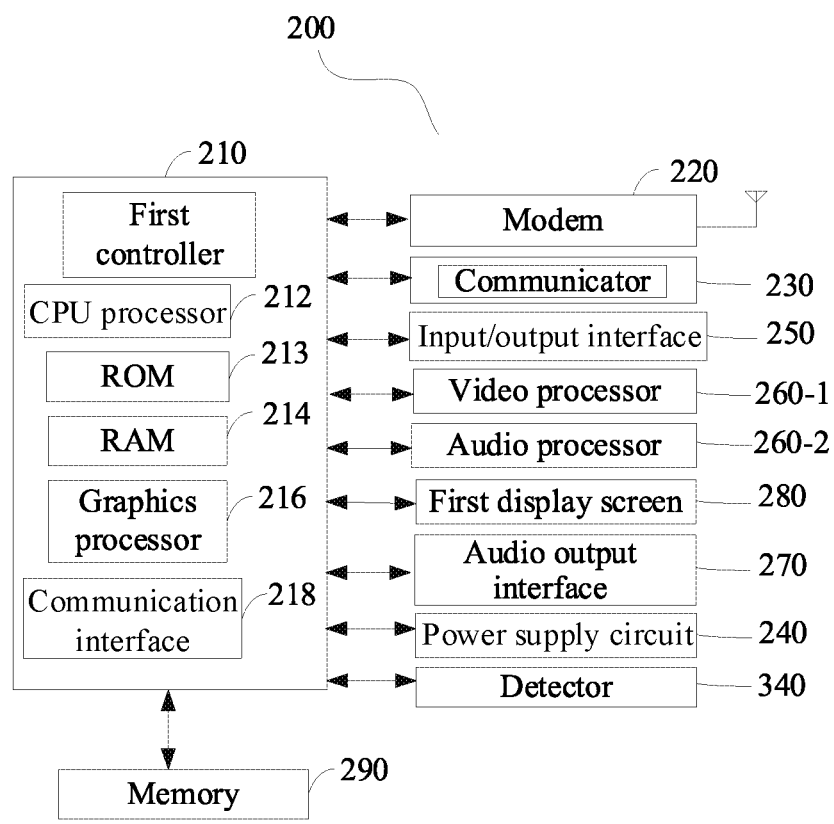
FIG. 6 shows a schematic diagram of the functional configuration of the display apparatus according to an embodiment.

FIG. 6 shows a schematic diagram of the functional configuration of the display apparatus according to an embodiment. As shown in FIG. 6, the memory 290 is used to store the programs that drives the first controller 210 in the display apparatus 200 to run, and stores various applications in the display apparatus 200, various applications downloaded by the user from external devices, various graphical user interfaces related to the applications, various objects related to the graphical user interfaces, user data information, and various internal data supporting the applications. The memory 290 is used to store a kernel, a middleware, applications and other system software of an operating system (OS), and store input video data and audio data, and other user data.

The memory 290 is specifically used to store the drive programs and related data of the video processor 260-1, the audio processor 260-2, the first display screen 280, the communicator 230, the modem 220, the input/output interface, etc.

In some embodiments, the memory 290 may store software and/or programs, and software applications for an Operating System (OS) include: for example, a kernel, a middleware, an application interface (API) and/or applications. Exemplarily, the kernel is used to control or manage system resources, or functions implemented by other programs (for example, the middleware, the API or applications). The kernel provides an interface, to allow the middleware and the API or applications to access the controller, to control or manage system resources.

The disclosure can adopt a two power supply control structure or a multi-power supply control structure. In the following, for the convenience of description, an example of a power supply of a display structure with two power supplies is provided with reference to FIG. 7, and an example of a power supply with a display structure with a single power supply is provided with reference to FIG. 8.

Figure 7:
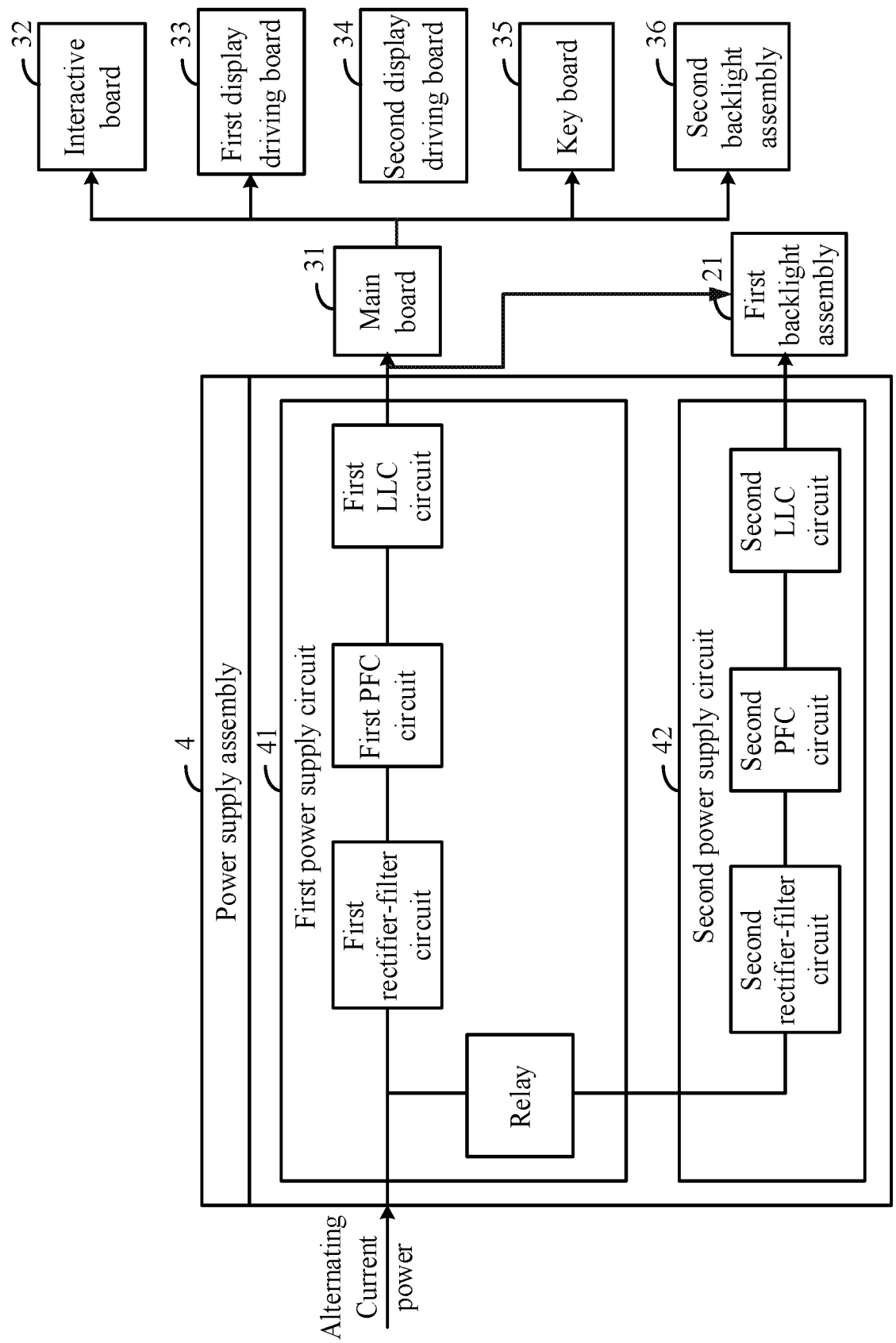
FIG. 7 shows a specific structural diagram of a power supply architecture in the disclosure, wherein the display apparatus has dual power supplies.

FIG. 7 shows a structural diagram of a power supply architecture in the disclosure, wherein the display apparatus has two power supplies. Referring to FIG. 2 and FIG. 7, the power supply board 4 on the first display screen 201 may mainly include a main power supply board 41 and a secondary power supply board 42. The main power supply board 41 and the secondary power supply board 42 have a substantially same architecture. Next, the working principle will be discussed in detail by taking the main power supply board 41 as an example.

The main power supply board 41 may include a first rectifier-filter circuit, a first PFC (Power Factor Correction) circuit and a first LLC circuit which are connected in sequence.

Here, the first rectifier-filter circuit may include: a bridge rectifier and a filter, where the bridge rectifier is used to rectify the input alternating current and provide a full-wave signal output into a Power Factor Correction (PFC) circuit. Before the Alternating Current (AC) is input to the first PFC circuit, an Electromagnetic Interference (EMI) filter may be connected to perform high-frequency filtering on the input AC.

The first PFC circuit generally includes a PFC inductor, a switch power device and a PFC control chip, and mainly performs the power factor correction on the input AC and provides a stable DC busbar voltage (e.g., 380V) to the first resonant converter (LLC) circuit. The first PFC circuit can effectively improve the power factor of the power source and ensure the same phase of the voltage and current.

The first LLC circuit may adopt a LLC resonant conversion circuit with two MOS transistors, and may also include components such as a Pulse frequency modulation (PFM) circuit, a capacitor and an inductor. Specifically, the first LLC circuit may step down or up the DC busbar voltage input from the first PFC circuit, and output a constant voltage to loads. Here, the loads may include loads as shown in FIG. 3. Typically, the first LLC circuit can output a variety of different voltages to meet the requirements of the loads. For example, the first LLC circuit supplies power to the main board 31, the first LLC circuit supplies power to the first backlight assembly 21, and so on. The main board also supplies power (such as power supply of 12V or 18V) to the interactive board 32, the first display driving board 33, the second display driving board 34, the key board 35 and the second backlight assembly 22 to ensure that each board can work.

In some embodiments, the main power supply board 41 further includes a first synchronous rectifier circuit (not shown in the figure), which may include a transformer, a controller, two MOS transistors and a diode, and which can directly output a stable target voltage, such as 12V or 18V, etc. It should be noted that the first synchronous rectifier circuit may be provided independently or may be provided in the first LLC circuit.

The main power supply board 41 also includes a power relay for controlling the power supply to the secondary power supply board 42.

The secondary power supply board 42 may include a second rectifier-filter circuit, a second PFC circuit and a second LLC circuit which are connected in order, wherein the AC power of the secondary power supply board 42 comes from the main power supply board 41, and the second LLC circuit can provide the power supply for the first backlight assembly 21, etc. The description of the rest circuits refer to the description of the main power supply board. In some embodiments, the secondary power supply board 42 further includes a second synchronous rectifier circuit, wherein the second synchronous rectifier circuit may refer to the implementations of the first synchronous rectifier circuit.

It should be noted that the arrows in FIG. 4 are all used to indicate that the power supply board directly or indirectly supplies power to other components than the power supply board in the display apparatus 200. Furthermore, the main power supply board may output a first backlight display signal to the first display driving board 33 in addition to supplying power. The secondary power supply board may output a second backlight display signal to the first display driving board 33 in addition to supplying power, wherein the first backlight display signal is used to cause the backlight of a first area in the first display screen to be turned on. The second backlight display signal is used to cause the backlight of a second area in the first display screen to be turned on. The first area and the second area together constitute a display area of the first display screen.

Figure 8:
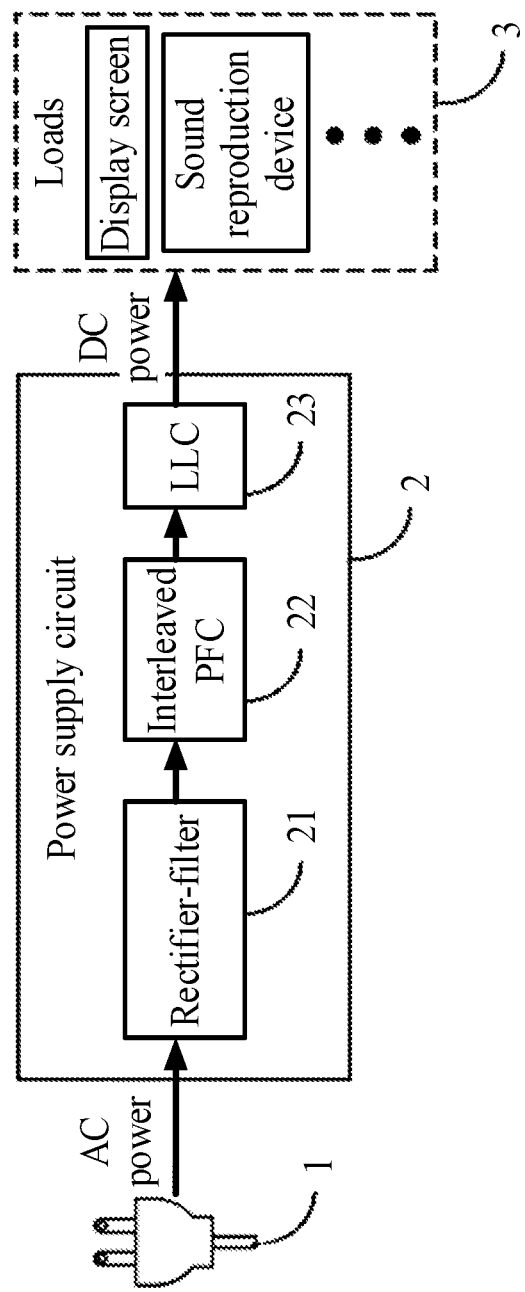
FIG. 8 shows a specific structural diagram of another power supply architecture in the disclosure, wherein the display apparatus has a single power supply.

FIG. 8 shows another power supply architecture in the disclosure, wherein the display apparatus has a single power supply. As shown in FIG. 8, the display apparatus provided in the disclosure may be connected to the commercial AC power grid through its power supply 1. AC is employed in the power grid, while the load 3 in the display apparatus needs to be driven by DC.

Therefore, in addition to obtaining the AC power through the power supply 1, the display apparatus also needs to convert the AC power into the DC power through a power supply circuit 2 and then send the DC power to the load 3 in the display apparatus to drive the load 3 to realize related functions. The process of converting the AC power into the DC power may be called "rectification", and may be implemented by a rectifier circuit in the power supply circuit 2. Exemplarily, if the electrical device is a TV set, the TV set is connected to the power grid through the power supply 1 and obtains the AC power, and then the power supply circuit 2 converts the obtained AC power into the DC power. The DC power can drive the host, the display screen or the sound reproduction device (or a speaker, a sound bar) or other devices as loads in the TV set to work, to realize the function of the TV set.

Figure 9:
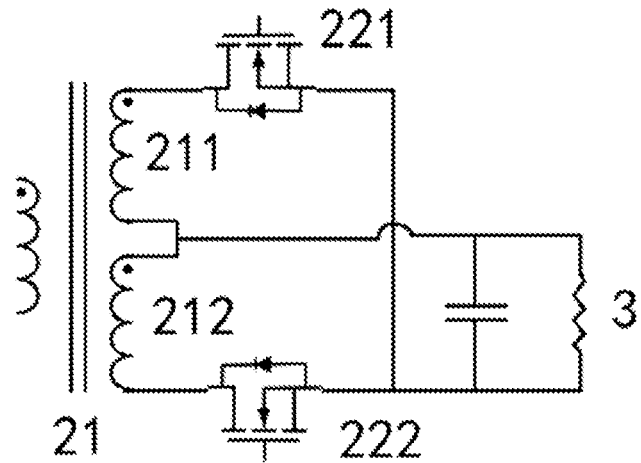
FIG. 9 is a structural schematic diagram of the main components in the LLC synchronous rectifier circuit, to illustrate the working principle of the rectifier circuit.

In some embodiments, the rectifier circuit in the power supply circuit 2 includes: a rectifier-filter circuit 21, an interleaved PFC 22 and an LLC synchronous rectifier circuit 23. With respect to the LLC synchronous rectifier-filter circuit 23, FIG. 9 is a structural schematic diagram of the main components in the LLC synchronous rectifier circuit, to illustrate the working principle of the rectifier circuit, wherein a primary coil on the left side of coils 21 in the rectifier circuit is used to receive the AC power processed by the rectifier-filter circuit 21 and the interleaved PFC 22. The coils 21 include two secondary coils: a secondary coil 211 and a secondary coil 212. In order to control the circuits corresponding to the two secondary coils, the secondary coil 211 is connected to the load 3 through the MOSFET 221, and the secondary coil 212 is connected to the load 3 through the MOSFET 222. Since the AC power received by the primary coil has a positive half cycle and a negative half cycle with opposite current directions, the MOSFET 221 and MOSFET 222 are respectively turned on in two different half cycles corresponding to the AC power, so that the secondary coils corresponding to the turned-on MOSFETs will convert the AC power into the DC power in different half cycles respectively and then input it into the load 3. The load 3 can continuously receive the DC power in the same direction sent from the MOSFET 221 or MOSFET 222 in the positive and negative half cycles corresponding to the AC power, thereby realizing the conversion of the AC power into the DC power.

It should be noted that the rectifier circuit shown in FIG. 8 and the LLC synchronous rectifier circuit shown in FIG. 9 are only schematic diagrams, and only include main functional components. The disclosure does not limit other specific implementations of the rectifier circuit and the LLC synchronous rectifier circuit.

Figure 10:
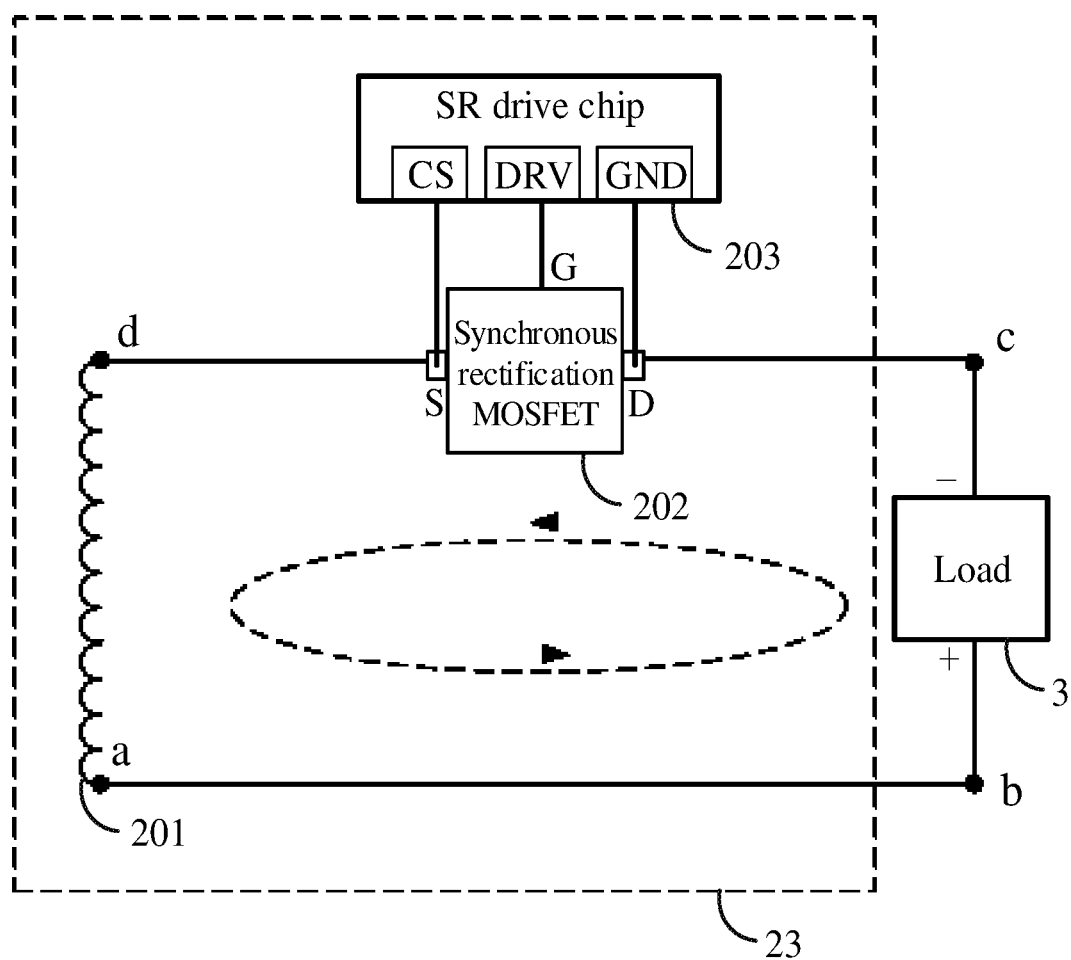
FIG. 10 is a structural schematic diagram of a control circuit of a synchronous rectification MOSFET.

In some embodiments, the controller provided in the LLC synchronous rectifier circuit is used to turn on and turn off the MOSFET in the rectifier circuit as shown in FIG. 9, and the controller may be a Synchronous Rectification (SR) drive chip in the LLC synchronous rectifier circuit. Specifically, FIG. 10 is a structural schematic diagram of a control circuit of a synchronous rectification MOSFET, wherein the secondary coil and MOSFET corresponding to any loop in FIG. 9 is taken as an example in FIG. 10. Then, in FIG. 10, the secondary coil 201 is connected to the source (S) of the synchronous rectification MOSFET 202, and the drain (D) of the synchronous rectification MOSFET 202 is connected to the load 3. The secondary coil 201, the synchronous rectification MOSFET 202 and the load 3 form a closed loop, and meanwhile, the current direction for supplying power to the load through the secondary coil 201 is a-b-c-d in the figure.

Meanwhile, the SR drive chip 203 in the rectifier circuit 2 may be connected to the source and drain of the synchronous rectification MOSFET 202 through its CS pin and GND pin respectively, and to the gate (G) of the synchronous rectification MOSFET 202 through its DRV pin. The SR drive chip 203 is used to obtain a voltage difference between the source and drain of the synchronous rectification MOSFET 202, and compare the obtained voltage difference with a preset threshold. In response to the voltage difference being greater than a preset threshold, a control signal for controlling the turning-on between the source and drain of the MOSFET 202 is sent to the gate of the synchronous rectification MOSFET 202; and in response to the voltage value being less than the preset threshold, a control signal for controlling turning off between the source and drain of the MOSFET 202 is sent to the gate of the synchronous rectification MOSFET 202, realizing the control of the turning-on and turning-off of the synchronous rectification MOSFET.

Figure 11:
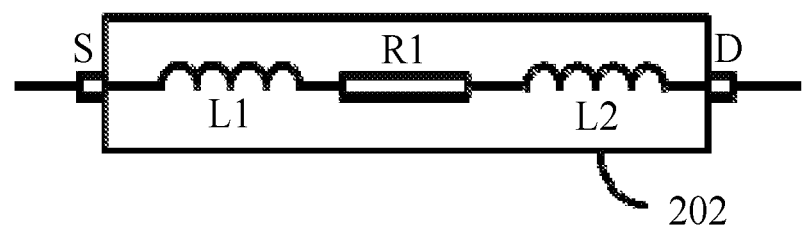
FIG. 11 is a structural schematic diagram of a synchronous rectification MOSFET including pins.

However, in the rectifier circuit shown in FIG. 10, the synchronous rectification MOSFET is usually soldered on the circuit board through its pins in the form of chip. Since the pins themselves are also conductors, the pins of the synchronous rectification MOSFET will generate the parasitic inductance when the current flows through them. For example, FIG. 11 is a structural schematic diagram of a synchronous rectification MOSFET including pins. In addition to its own internal resistance R1 that will generate a voltage drop when the current passes through it, the parasitic inductances L1 and L2 on the pins of the source and drain of the synchronous rectification MOSFET will also produce a voltage drop when the flowing current changes, resulting in different voltages at both pins of the source and drain. Meanwhile, if the voltage between the source and drain of the synchronous rectification MOSFET detected by the SR drive chip cannot truly reflect the voltage drop caused by the current that actually flows through the synchronous rectification MOSFET, the SR drive chip cannot further send a control signal to the synchronous rectification MOSFET with complete accuracy according to the detected voltage, thereby affecting the on and off timing of the synchronous rectification MOSFET.

Figure 12:
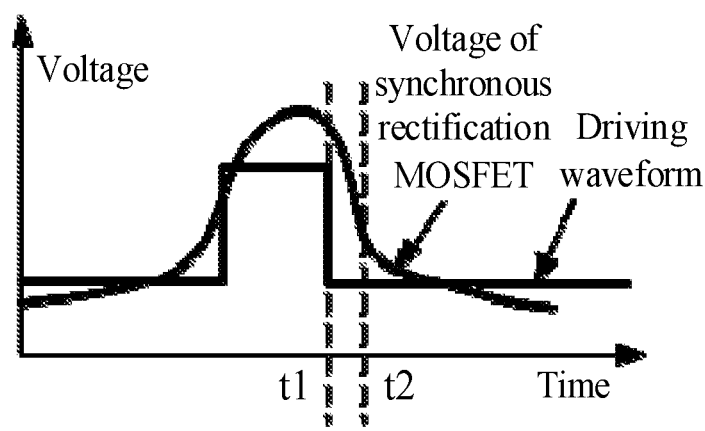
FIG. 12 is a schematic diagram of a control signal sent from an SR drive chip.

For example, FIG. 12 is a schematic diagram of a control signal sent from the SR drive chip, wherein the voltage generated by the current flowing through the synchronous rectification MOSFET decreases from the peak, and a voltage drop will also be generated due to the parasitic inductance of the pin when the current flows through the pins of the synchronous rectification MOSFET, causing the voltage across the pins of the synchronous rectification MOSFET to drop ahead of time. For the SR drive chip, in response to determining that the detected voltage is less than a preset threshold at the moment t1, the SR drive chip may send a low-level control signal to the synchronous rectification MOSFET to cause a turning-off between the source and drain of the synchronous rectification MOSFET.

Meanwhile, since the voltage across the synchronous rectification MOSFET detected by the SR drive chip is lower than the voltage actually generated by the current flowing through the synchronous rectification MOSFET, the voltage actually generated by the current flowing through the synchronous rectification MOSFET drops to the preset threshold at the moment t2, but the SR drive chip has already controlled the synchronous rectification MOSFET to be turned off at the moment t1. Therefore, since the SR drive chip controls the synchronous rectification MOSFET to be turned off before the moment t2, the synchronous rectification MOSFET are turned off between the moments t1 and t2. Due to the action of its internal parasitic diode, when the current flowing through the synchronous rectification MOSFET is relatively large, the overall heating phenomenon of the synchronous rectification MOSFET is worse, increasing the loss of the synchronous rectification MOSFET.

In addition, the synchronous rectification MOSFET may be made of a surface mount MOSFET with smaller pins in specific embodiments. If the surface mount MOSFET is used in the rectifier circuit, the parasitic inductance of the pins is reduced, but the heat dissipation measures of the surface mount MOSFET are not easy to implement in the design of two or more layers of PCB boards in the circuit board. The special design for heat dissipation for the surface mount MOSFET significantly increases the cost, so the parasitic inductance of the pins of the synchronous rectification MOSFET in the rectifier circuit generally cannot be eliminated by using the surface mount MOSFET.

Therefore, the disclosure provides a compensation circuit for a synchronous rectification MOSFET, where the parasitic signal generated by the synchronous rectification MOSFET is compensated by the electromagnetic induction coil arranged in the synchronous rectifier circuit, so that the voltage across the synchronous rectification MOSFET detected by the processor can reflect the voltage generated actually by the current flowing through the synchronous rectification MOSFET more accurately, so as to solve the problem that the parasitic inductance on the pin of the synchronous rectification MOSFET affects the voltage across the synchronous rectification MOSFET detected by the SR drive chip and thus affects the control of turning-on and off of the synchronous rectification MOSFET by the SR drive chip, and therefore reducing the heating phenomenon of the MOSFET and reducing the loss of the synchronous rectification MOSFET.

The embodiments of the disclosure will be described in detail below with specific embodiments. Several specific embodiments below can be combined with each other, and the same or similar concepts or processes may be omitted in some embodiments.

The disclosure provides a compensation circuit, which can be applied to the power supply circuit 2 of the display apparatus as shown in FIG. 7 and can specifically be used to compensate the parasitic signal generated by the synchronous rectification MOSFET 202 in the LLC synchronous rectification 23 in the rectifier circuit as shown in FIG. 8 in the power supply circuit. The compensation circuit includes:

an electromagnetic induction coil that is arranged in a closed loop formed by a secondary coil, a synchronous rectification MOSFET and a load in the synchronous rectifier circuit. When a closed loop current flows in the closed loop, an electromotive force may be induced between both ends of the electromagnetic induction coil according to the law of electromagnetic induction under the action of the closed loop current, where the induced electromotive force may be used to compensate the voltage drop generated by the parasitic inductance of the pins when the current flows through the pins of the synchronous rectification MOSFET.

The compensation signal and the parasitic signal in this embodiment may be voltage signals. For example, the compensation signal may be the induced electromotive force generated by the electromagnetic induction coil, and the parasitic signal may be the voltage drop generated by the parasitic inductance of the pins of the synchronous rectification MOSFET. Alternatively, the compensation signal and the parasitic signal in this embodiment may also be current signals, etc. The disclosure uses the compensation signal and the parasitic signal being voltage signals as an exemplary description, rather than limiting the specific representations thereof.

In this embodiment, the compensation signal generated by the electromagnetic induction coil can be used to counteract the parasitic signal generated by the inductance of the pins of the synchronous rectification MOSFET when the processor controls the synchronous rectification MOSFET. For example, in the control circuit shown in FIG. 10, since the pin of the synchronous rectification MOSFET itself is also a conductor, the pin of the synchronous rectification MOSFET will generate the parasitic inductance when the current flows through it. The parasitic inductance also generates a voltage drop when the flowing current changes. Meanwhile, the voltage between the source and drain of the synchronous rectification MOSFET detected by the SR drive chip as a processor includes a parasitic signal, and the SR drive chip can obtain the final detection voltage by compensating the parasitic signal through the compensation signal generated by the parasitic coil, so that the final detection voltage detected by the SR drive chip can more truly reflect the voltage actually generated by the current flowing through the synchronous rectification MOSFET.

Figure 13:
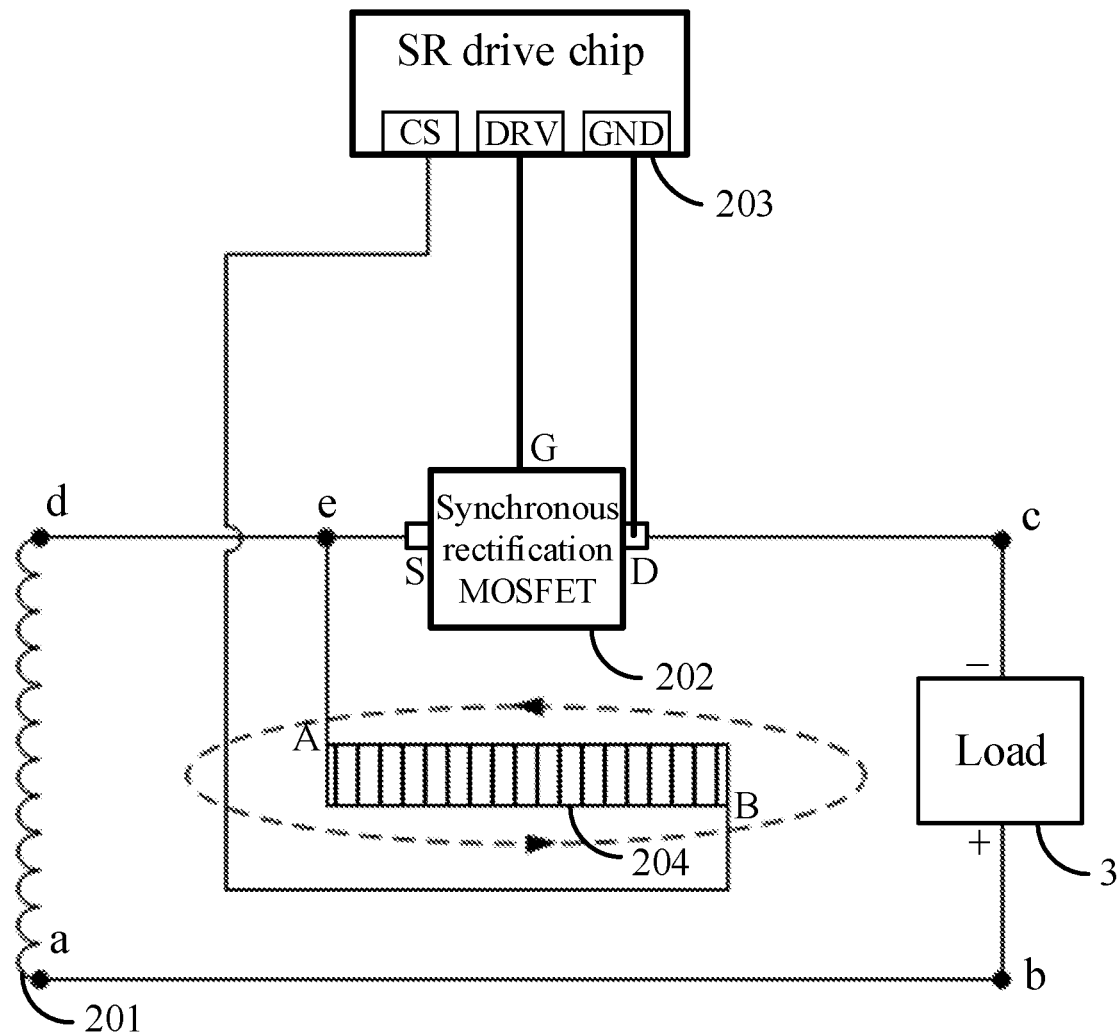
FIG. 13 is a structural schematic diagram of a compensation circuit according to an embodiment.

In some embodiments, FIG. 13 is a structural schematic diagram of a compensation circuit according to an embodiment. In the compensation circuit as shown in FIG. 13, the secondary coil 201 is connected to the source (S) of the synchronous rectification MOSFET 202, and the drain (D) of the synchronous rectification MOSFET 202 is connected to the load 3. The working states of the synchronous rectification MOSFET 202 include on state and off state. When the MOSFET 202 is in on state, the source and the drain are turned on, and the DC power induced by the secondary coil 201 flows into the load 3 through the synchronous rectification MOSFET 202. Meanwhile, the direction of the current through the secondary coil 201 that supplies power to the load is a-b-c-d in the figure; when the MOSFET 202 is in the off state, the source and the drain are turned off, and there is no induced DC power on the secondary coil 201.

Here, the secondary coil 201, the synchronous rectification MOSFET 202 and the load 3 in this embodiment form a closed loop, the electromagnetic induction coil 204 is placed in the closed loop, the first terminal A of the electromagnetic induction coil 204 is connected to the source of the synchronous rectification MOSFET, and the second terminal B is connected to the CS pin of the processor 203.

When the synchronous rectification MOSFET 202 is in the on state, the current in the direction a-b-c-d in the closed loop causes an induced electromotive force to be generated between the first terminal A and the second terminal B of the electromagnetic induction coil 204 as a compensation signal for compensating the parasitic signal generated by the parasitic inductance on the pin of the synchronous rectification MOSFET 202.

Figure 14:
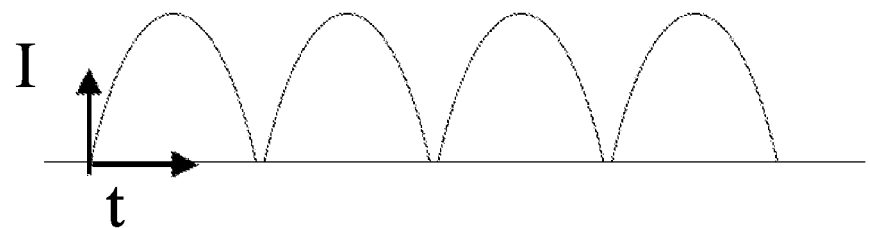
FIG. 14 shows a waveform of the current output from a secondary coil.

In some embodiments, for the electromagnetic induction coil 204 in the embodiment shown in FIG. 13, the area of the coil is positively correlated with the parasitic inductance of the pin in the synchronous rectification MOSFET 202, so that the compensation signal generated by the electromagnetic induction coil is related to the parasitic signal generated by the parasitic inductance. For example, FIG. 14 is a waveform diagram of the current output by the secondary coil, that is, the magnitude of the current I output from the secondary coil 201 to the synchronous rectification MOSFET 202 in FIG. 13 changes with time t following a waveform like a steamed bun. Then, for the parasitic inductance (L) on the pin(s) of the MOSFET 202, when the current flowing through the pin(s) of the MOSFET 202 changes, the parasitic inductance will generate a voltage $\Delta U = L*dI/dt$ (Formula 1).

Meanwhile, the changing current dI/dt will create the changing magnetic field dB/dt, and the changing magnetic field may create the induced electromotive force in a closed coil. That is to say, the voltage created by the parasitic inductance on the pin of the MOSFET 202 when the current changes may be "equivalent" to the induced electromotive force $\Delta u = n*d\emptyset/dt = n*dB/dt*S$ (Formula 2) generated by a "virtual" electromagnetic induction coil when the magnetic flux Ø changes, wherein A is the electromagnetic induction coefficient, S is the area of the electromagnetic induction coil, and n is the number of windings of the electromagnetic induction coil. By combining the Formula 1 and Formula 2 described above, the equation $\Delta u = n*d\emptyset/dt = n*dB/dt*S = n*A*di/dt*S$ (Formula 3) can be obtained. Finally, it can be concluded from the Formula 3 that the voltage generated by the parasitic inductance L may be represented by n*A*di/dt*S. If there is a need to counteract the above-mentioned voltage generated by the parasitic inductance, n*A*S in the Formula 3 may be equal to −L, and an induced electromotive force equal in magnitude and opposite in direction to Au can be obtained.

Therefore, in the embodiment shown in FIG. 13, when the total inductance value L of the parasitic inductances introduced by the source and drain pins of the synchronous rectification MOSFET 202 is known, the coil area S of the electromagnetic induction coil 204 to be arranged can be calculated by Formula 3 (assuming that the number n of coil windings is a fixed value, or the coil area S and the number n of coil windings can be calculated both by Formula 3), so as to cause the electromagnetic induction coil to change magnetic flux while the current is changing, so that: when the parasitic inductance L has been generated, a compensation signal whose magnitude ("−L") is equivalent to that generated by the parasitic inductance and direction opposite to the direction of the parasitic inductance is generated to counteract the effect of the parasitic signal.

Exemplarily, in the circuit shown in FIG. 13, when the current flows through the synchronous rectification MOSFET 202, the voltage drop caused by the internal resistance is 1V, the parasitic inductance L on the pin(s) can generate an induced electromotive force of 2 mV, and then the area S of the electromagnetic induction coil should be set to allow an induced electromotive force of −2 mV.

Here, in some embodiments, in order to avoid the overall circuit abnormality caused by the excessive compensation signal generated by the electromagnetic induction coil, the coil area S can also be determined by the formula n*A*S<=−L, so as to limit the magnitude of the compensation signal generated by the electromagnetic induction coil.

In some embodiments, on the basis that the electromagnetic induction coil 204 arranged in the embodiment shown in FIG. 13 can provide the compensation signal, the SR drive chip 203 can use the compensation signal provided by the electromagnetic induction coil 204 to make signal compensation considering the parasitic signal of the synchronous rectification MOSFET when controlling the synchronous rectification MOSFET 202.

Meanwhile, the processor 203 not only connects to the second terminal B of the electromagnetic induction coil 204 through its CS pin, but also connects to the drain of the synchronous rectification MOSFET through its GND pin, so the processor 203 can detect the voltage between the second terminal B of the electromagnetic induction coil 204 and the drain of the synchronous rectification MOSFET, generate a control signal according to the detected voltage, and send the control signal to the gate (G) of the synchronous rectification MOSFET through the DRV pin, where the control signal is used to control the working state of synchronous rectification MOSFET. Since the electromagnetic induction coil can provide a virtual inductance with an inductance value equivalent to "−L" through electromagnetic induction, the induced electromotive force that can be generated by the electromagnetic induction coil is denoted as "−ΔU", while the induced electromotive force that can be generated by the parasitic inductance L of the pins of the synchronous rectification MOSFET is denoted as "ΔU".

Thus, when the SR drive chip detects the voltage between the second terminal B of the electromagnetic induction coil 204 and the drain of the synchronous rectification MOSFET, "−ΔU" and "ΔU" are equal in magnitude and opposite in direction, which can be counterbalanced so that the voltage detected by the SR drive chip can more truly reflect the voltage drop caused by the current that actually flows through the synchronous rectification MOSFET, and further a control signal is accurately sent to the synchronous rectification MOSFET according to the detected voltage.

Figure 15:
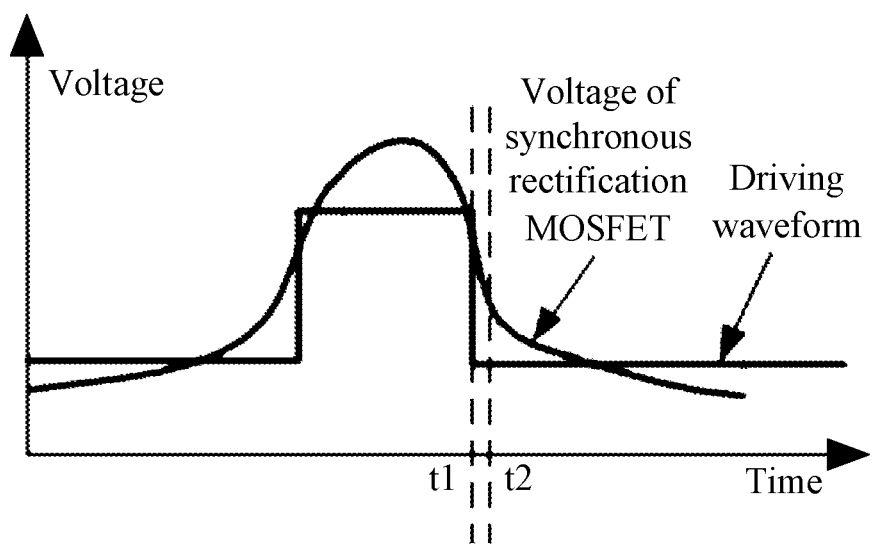
FIG. 15 is a schematic diagram of a control signal sent from the SR drive chip, according to an embodiment.

For example, FIG. 15 is a schematic diagram of a control signal sent from the SR drive chip of the disclosure, wherein the voltage generated by the current flowing through the synchronous rectification MOSFET decreases from the peak, and a voltage drop will also be generated due to the parasitic inductance of the pin even when the current flows through the pin of the synchronous rectification MOSFET, causing the voltage across the pins of the synchronous rectification MOSFET to drop ahead of time. For the SR drive chip, since it is the voltage between the second terminal of the electromagnetic induction coil and the drain of the synchronous rectification MOSFET that detected, the SR drive chip can more accurately determine the voltage generated actually by the current flowing through the synchronous rectification MOSFET according to the detected voltage. In response to the detected voltage being less than a preset threshold at the moment t1, a low-level control signal is sent to the synchronous rectification MOSFET to cause a turning-off between the source and drain of the synchronous rectification MOSFET2. Meanwhile, since the voltage across the switch transistor detected by the SR drive chip is closer to the actual voltage of the synchronous rectification MOSFET, the SR drive chip can generate the driving waveform as shown in FIG. 15 according to the more accurate voltage.

Comparing the driving waveform in FIG. 15 with the driving waveform in FIG. 12, the moment t1 is closer to t2 in FIG. 15. Under some ideal conditions such as "−ΔU" and "ΔU", t1 may also be closer to t2 or even same as t2, thereby reducing the duration of heating caused by the parasitic diode inside the synchronous rectification MOSFET when it has been turned off between the moments t1 and t2, and thus reducing the loss of the synchronous rectification MOSFET.

In some embodiments, and in the above-mentioned embodiment shown in FIG. 13, taking the electromagnetic induction coil 204 connected to the source of the synchronous rectification MOSFET 202 as an example, the voltage detected by the SR drive chip is equivalent to the voltage across the electromagnetic induction coil 204 and the MOSFET 202 in series. Therefore, in addition to the electromagnetic induction coil 204 being connected to the source of the synchronous rectification MOSFET 202 in the embodiment as shown in FIG. 13, the electromagnetic induction coil 204 may also be connected to the drain of the synchronous rectification MOSFET 202 in another implementation.

Figure 16:
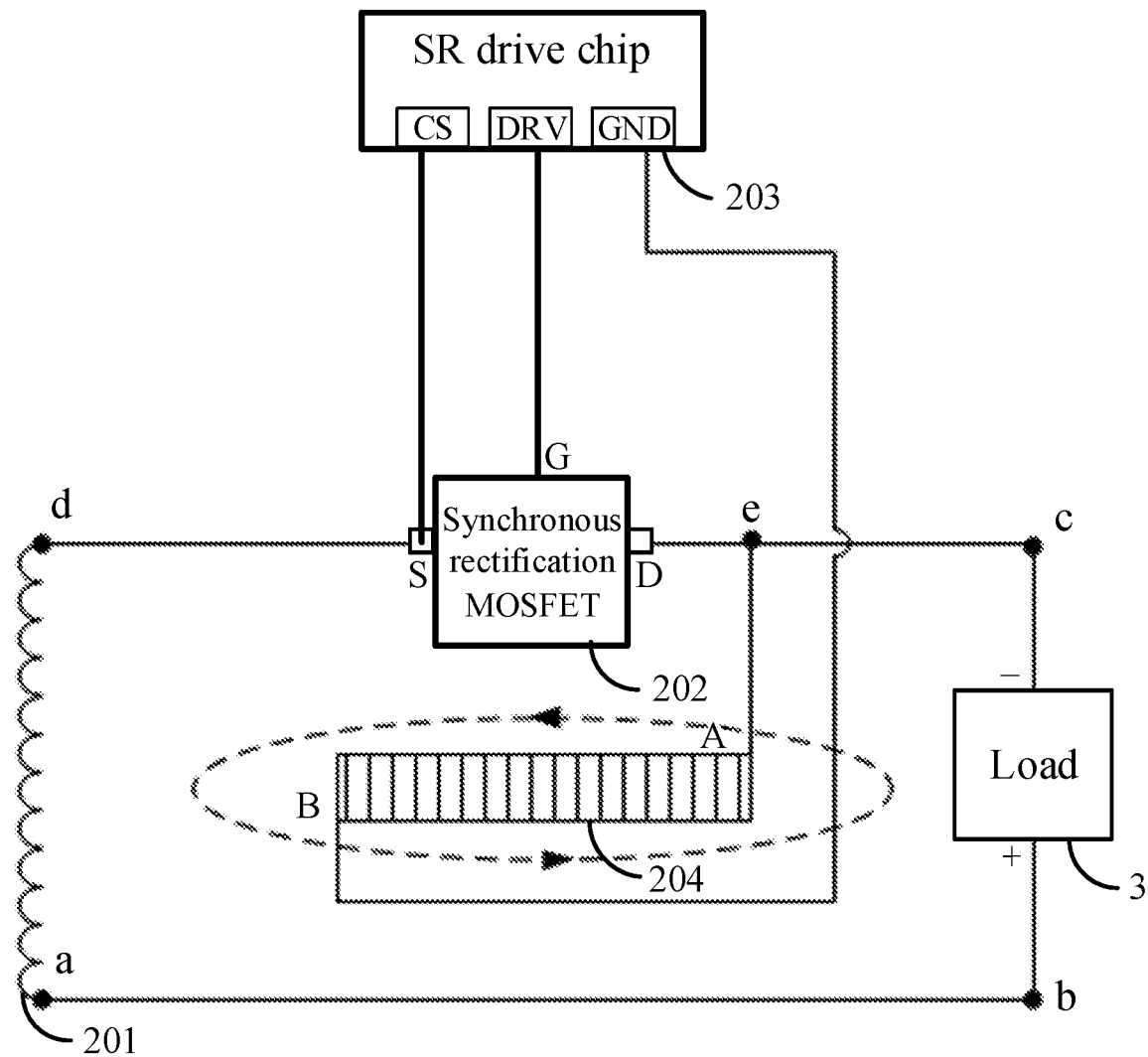
FIG. 16 is a structural schematic diagram of a compensation circuit of a synchronous rectification MOSFET according to another embodiment.

For example, FIG. 16 is a structural schematic diagram of another embodiment of the compensation circuit of the synchronous rectification MOSFET according to the disclosure. In the compensation circuit as shown in FIG. 16, the secondary coil 201 is connected to the source (S) of the synchronous rectification MOSFET 202, and the drain (D) of the synchronous rectification MOSFET 202 is connected to the load 3. The secondary coil 201, the synchronous rectification MOSFET 202 and the load 3 form a closed loop, the electromagnetic induction coil 204 is placed in the closed loop, the first terminal A of the electromagnetic induction coil 204 is connected to the drain of the synchronous rectification MOSFET, and the second terminal B is connected to the GND pin of the processor 203. When the synchronous rectification MOSFET202 is in the on state, the closed loop current in the direction a-b-c-d in the closed loop induces an electromotive force between the first terminal A and the second terminal B of the electromagnetic induction coil 204 as a compensation signal for compensating the parasitic signal generated by the parasitic inductance on the pins of the synchronous rectification MOSFET 202. The compensation signal generated in the embodiment as shown in FIG. 16 and the principle of compensating for the parasitic signal by the compensation signal are similar to those shown in FIG. 13, and will not be repeated here.

Figure 17:
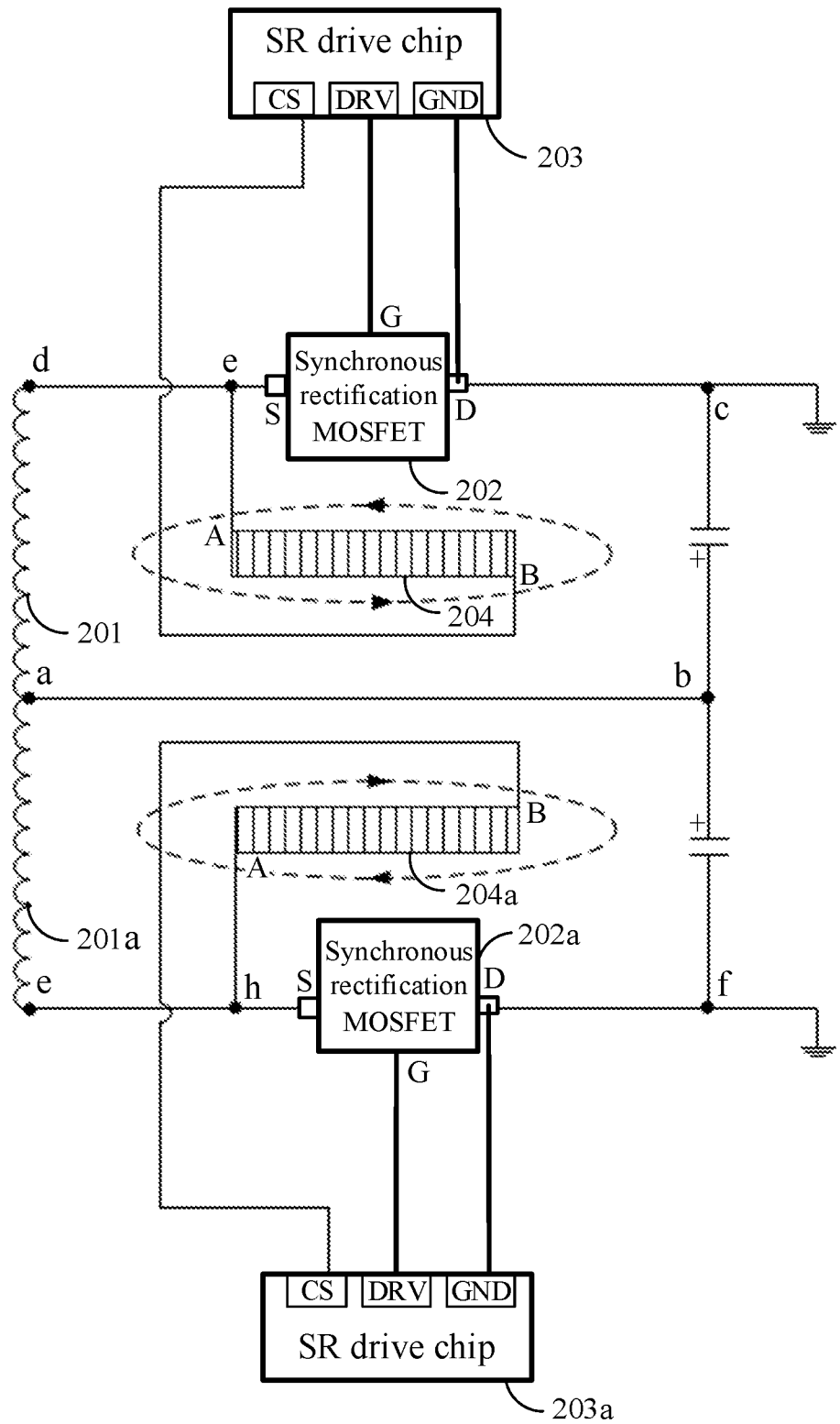
FIG. 17 is a structural schematic diagram of a compensation circuit of a synchronous rectification MOSFET according to another embodiment.

In some embodiments, and in the above-mentioned embodiments shown in FIG. 13 and FIG. 16, the compensation circuit connected to a secondary coil in the rectifier circuit is taken as an example for description. In the actual implementation process, for example, the primary coil in the rectifier circuit as shown in FIG. 9 may usually be connected to two secondary coils, while one electromagnetic induction coil may be placed in a closed loop corresponding to this coil, the other secondary coil may be placed in another closed loop corresponding to that coil. For example, FIG. 17 is a structural schematic diagram of another embodiment of the compensation circuit of the synchronous rectification MOSFET according to the disclosure. In the circuit shown in FIG. 17, the primary coil in the rectifier circuit is connected to two secondary coils: a secondary coil 201 and a secondary coil 201a; and the secondary coil 201, the synchronous rectification MOSFET 202 and a load can form a closed loop, and an electromagnetic induction coil 204 is placed in this closed loop; the secondary coil 201a, the synchronous rectification MOSFET 202a and a load can also form another closed loop, and an electromagnetic induction coil 204a is placed in that closed loop.

When the AC power input to the primary coil corresponds to the positive half cycle and the negative half cycle respectively, the two closed loops convert the AC power into the DC power in different half cycles, and each electromagnetic induction coil in the two closed loops generates a compensation signal when the closed loop current flows through the loops respectively, to compensate for the parasitic signal generated by the parasitic inductance of the pin of the synchronous rectification MOSFET when the SR drive chip corresponding to the closed loop detects the voltage across the synchronous rectification MOSFET.

In order to implement the structure of the compensation circuit in the circuit structure as shown in FIG. 17, the wire connected between the synchronous rectification MOSFETM3 and the SR drive chip may be used as a coil, and an electromagnetic induction coil with n windings and area S can be obtained after winding n times according to the central area S. Similarly, the wire connected between the synchronous rectification MOSFETM3 and the SR drive chip may also be used as a coil, and an electromagnetic induction coil with n windings and area S can be obtained after winding n times according to the central area S. For the selection of the central area S of the winding and the number n of winding cycles, reference may be made to Formula 3 in the foregoing embodiment, which will not be repeated here. Finally, after winding the wires connected to the CS pins of two SR drive chips in the circuit shown in FIG. 17, the obtained rectifier circuit can be arranged on a single-sided PCB, so the compensation circuit provided in this embodiment also has desirable characteristics such as simple structure, small area and easy engineering realization.

In some embodiments, the controller provided in the LLC synchronous rectifier circuit is used to cause a turning-on and off of the MOSFET in the rectifier circuit as shown in FIG. 9, and the controller may be a Synchronous Rectification (SR) drive chip in the LLC synchronous rectifier circuit. For example, FIG. 18 is a structural schematic diagram of a control circuit of a synchronous rectification MOSFET.

Figure 18:
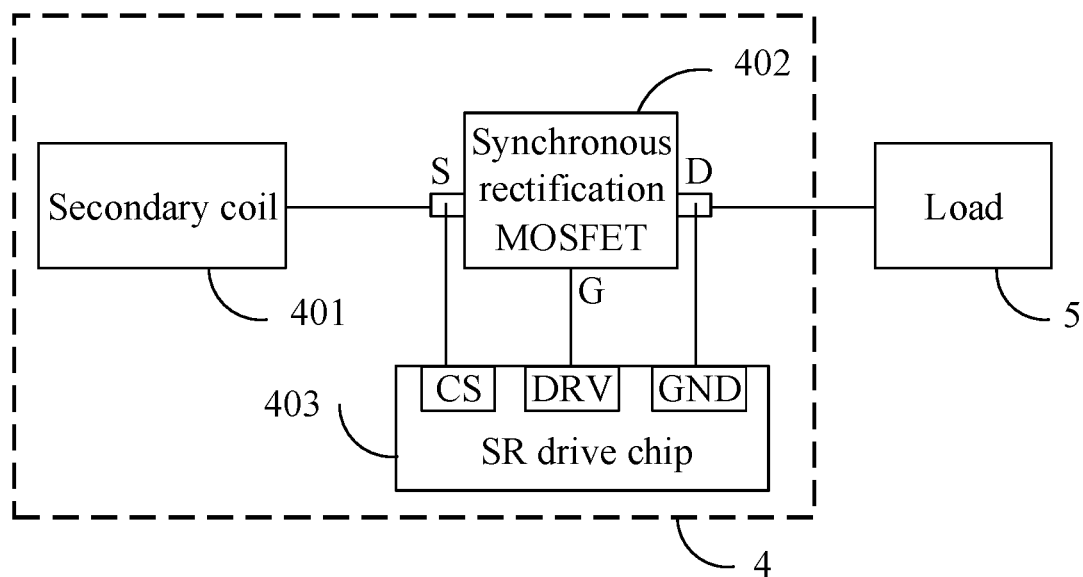
FIG. 18 is a structural schematic diagram of a control circuit of a synchronous rectification MOSFET.

Here, the secondary coil and MOSFET corresponding to a loop in FIG. 9 is taken as an example in FIG. 18. Then, in FIG. 18, the secondary coil 401 is connected to the source (S) of the synchronous rectification MOSFET 402, and the drain (D) of the synchronous rectification MOSFET 402 is connected to the load 5. Meanwhile, the SR drive chip 403 in the rectifier circuit 4 may be connected to the source and drain of the synchronous rectification MOSFET 402 through its CS pin and GND pin respectively, and to the gate (G) of the synchronous rectification MOSFET 402 through its DRV pin. The SR drive chip 403 is specifically used to obtain a voltage difference between the source and drain of the synchronous rectification MOSFET 402, and compare the voltage difference with a preset threshold. When the voltage value is greater than the preset threshold, a control signal for controlling the turning-on between the source and drain of the MOSFET 402 is sent to the gate of the synchronous rectification MOSFET 402; and when the voltage value is less than the preset threshold, a control signal for controlling the turning-off between the source and drain of the MOSFET 402 is sent to the gate of the synchronous rectification MOSFET 402, realizing the control of the turning-on and turning-off of the synchronous rectification MOSFET.

However, in the rectifier circuit shown in FIG. 18, the synchronous rectification MOSFET is mostly soldered on the circuit board through its pins in the form of chip. Since the pins themselves are also conductors, the pins of the synchronous rectification MOSFET will generate the parasitic inductance when the current flows through them.

Figure 19:
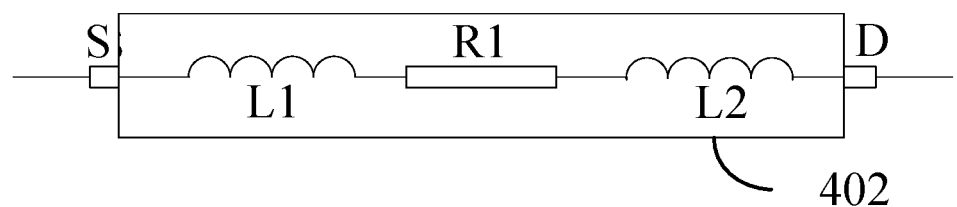
FIG. 19 is a structural schematic diagram of a synchronous rectification MOSFET including pins.

For example, FIG. 19 is a structural schematic diagram of a synchronous rectification MOSFET including pins. Here the parasitic inductances L1 and L2 on the pins of the source and drain of the synchronous rectification MOSFET will also produce a voltage drop when the current changes in addition to its own internal resistance R1 that will generate a voltage drop when the current passes through it, resulting in different voltages on both sides of the pins of the source and drain. Meanwhile, if the voltage between the source and drain of the synchronous rectification MOSFET detected by the SR drive chip cannot truly reflect the voltage drop caused by the current that actually flows through the synchronous rectification MOSFET, the SR drive chip cannot further send a control signal to the synchronous rectification MOSFET with complete accuracy according to the detected voltage, thereby affecting the timing of turning-on and turning-off of the synchronous rectification MOSFET.

Figure 20:
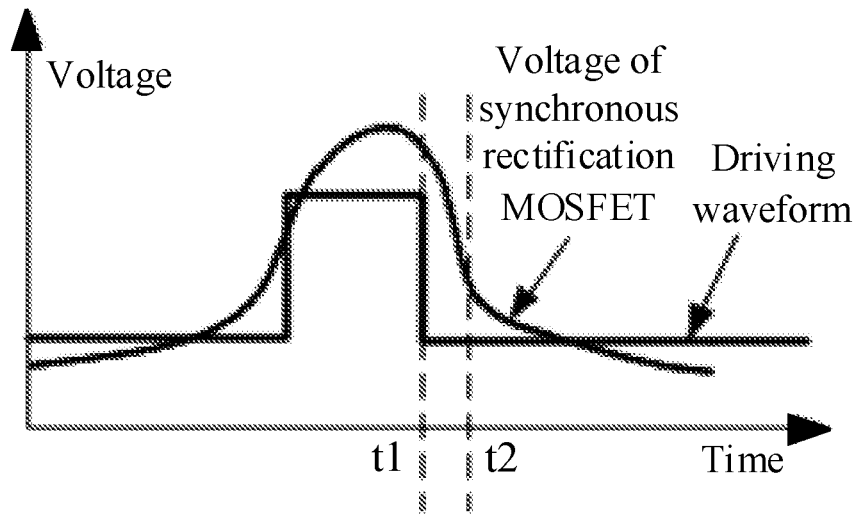
FIG. 20 is a schematic diagram of a control signal sent from an SR drive chip.

For example, FIG. 20 is a schematic diagram of a control signal sent by the SR drive chip, here the voltage generated by the current flowing through the synchronous rectification MOSFET decreases from the peak, and a voltage drop will also be generated due to the parasitic inductance of the pins when the current flows through the pins of the synchronous rectification MOSFET, causing the voltage across the pins of the synchronous rectification MOSFET to drop ahead of time. For the SR drive chip, in response to determining that the detected voltage is less than a preset threshold at the moment t1, the SR drive chip may send a low-level control signal to the synchronous rectification MOSFET to cause a turning-off between the source and drain of the synchronous rectification MOSFET. Since the voltage across the synchronous rectification MOSFET detected by the SR drive chip is lower than the voltage actually generated by the current flowing through the synchronous rectification MOSFET, the voltage actually generated by the current flowing through the synchronous rectification MOSFET drops to the preset threshold at the moment t2, but the SR drive chip has already controlled the synchronous rectification MOSFET to be turned off at the moment t1. That is, the SR drive chip controls the synchronous rectification MOSFET to be turned off before the moment t2, thus the synchronous rectification MOSFET is turned off between the moments t1 and t2. Due to the action of its internal parasitic diode, when the current flowing through the synchronous rectification MOSFET is relatively large, the overall heating phenomenon of the synchronous rectification MOSFET is relatively serious, increasing the loss of the synchronous rectification MOSFET.

In addition, the synchronous rectification MOSFET may be a surface mount MOSFET with smaller pins in the actual engineering implementation. If the surface mount MOSFET is used in the rectifier circuit, the parasitic inductance of the pins is reduced, but the heat dissipation measures of the surface mount MOSFET are not easy to achieve in the circuit board with two or more layers of PCB boards. Also, the special design for heat dissipation of the surface mount MOSFET greatly increases the cost. The parasitic inductance of the pins of the synchronous rectification MOSFET in the rectifier circuit generally cannot be eliminated by using the surface mount MOSFET.

Therefore, the disclosure provides a display apparatus and a control circuit, so as to solve the problem that the parasitic inductance on the pins of the synchronous rectification MOSFET of the display apparatus affects the voltage across the synchronous rectification MOSFET detected by the SR drive chip and thus affects the control of turning-on and off of the synchronous rectification MOSFET by the SR drive chip, and therefore reducing the heating phenomenon of the MOSFET in the rectifier circuit of the display apparatus and reducing the loss of the synchronous rectification MOSFET.

The embodiments of the disclosure will be described in detail below with specific embodiments. Several specific embodiments below can be combined with each other, and the same or similar concepts or processes may be omitted in some embodiments.

Figure 21:
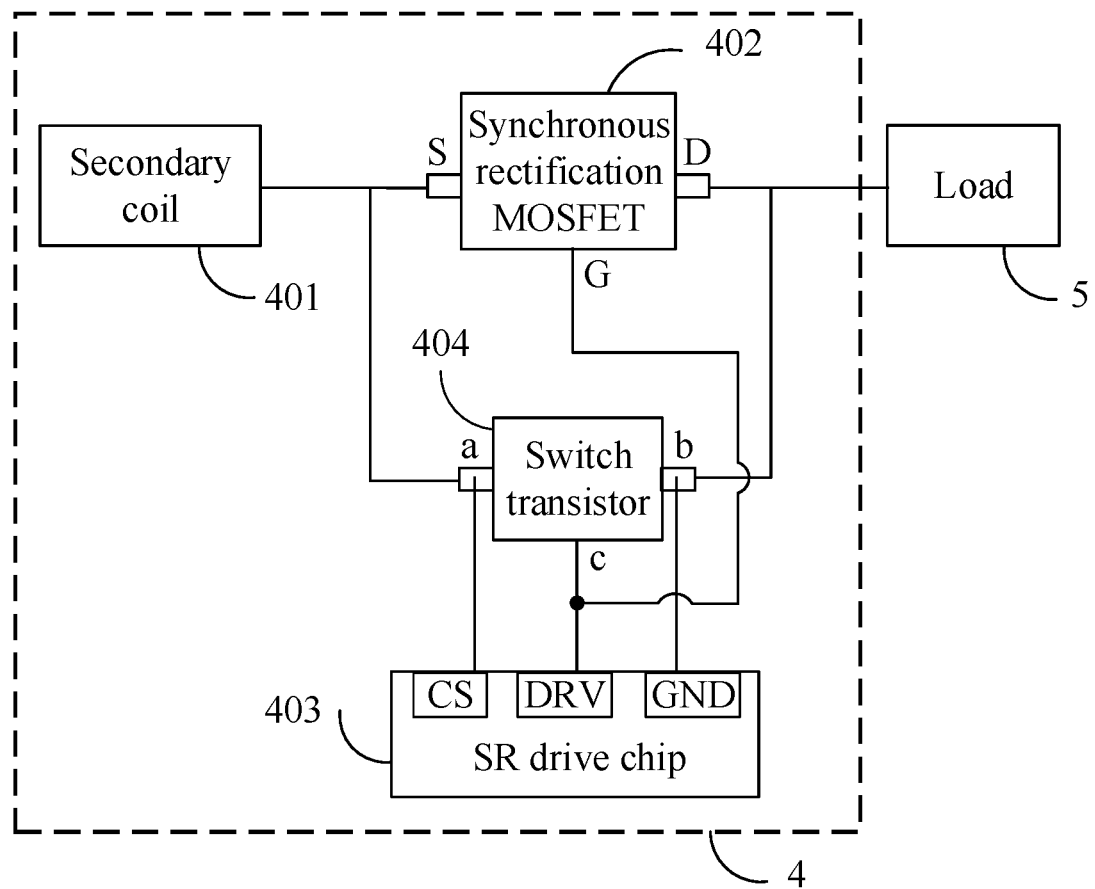
FIG. 21 is a structural schematic diagram of a control circuit according to an embodiment.

FIG. 21 is a structural schematic diagram of an embodiment of a control circuit according to the disclosure. As shown in FIG. 21, the control circuit provided in the disclosure may be a control circuit in a display apparatus and configured to control a synchronous rectification MOSFET in a rectifier circuit of the display apparatus, wherein the rectifier circuit 4 includes: a secondary coil 401 and a synchronous rectification MOSFET 402, the secondary coil 401 may be the secondary coil 211 or the secondary coil 212 in the synchronous rectifier circuit as shown in FIG. 9, and the synchronous rectification MOSFET 402 may be the MOSFET 221 connected to the secondary coil 211 or the MOSFET 222 connected to the secondary coil 212 in FIG. 9.

As shown in FIG. 21, the source (S) of the synchronous rectification MOSFET 402 is connected to the secondary coil 401, the drain (D) of the synchronous rectification MOSFET 402 is connected to the load 5, and the working states of the synchronous rectification MOSFET 402 includes on state and off state. In response to the MOSFET 402 being in the on state, the source and the drain are turned on, and the DC power induced by the secondary coil 401 flows into the load 5 through the synchronous rectification MOSFET 402; and in response to the MOSFET 402 being in the off state, the source and the drain are turned off, and there is no induced DC power on the secondary coil 401.

The control circuit for controlling the above-mentioned synchronous rectification MOSFET 402 provided in this embodiment includes: a switch transistor 404 and a controller 403. Here the switch transistor 404 is connected in parallel with the synchronous rectification MOSFET 402, a first terminal a of the switch transistor 404 is connected to the secondary coil 401, and a second terminal b of the switch transistor 404 is connected to the load 5. In some embodiments, the switch transistor 404 may be an MOSFET, where the first terminal a is the source of the MOSFET, the second terminal b is the drain of the MOSFET, and the third terminal c is the gate of the MOSFET.

Here, the parasitic inductance of the pin of the switch transistor 404 provided in this embodiment is smaller than the parasitic inductance of the pin of the synchronous rectification MOSFET 402. Exemplarily, the parasitic inductance of the source pin of the synchronous rectification MOSFET 402 is denoted as L1, the parasitic inductance of the drain pin is denoted as L2, the parasitic inductance of the pin of the first terminal a of the switch transistor is denoted as L1', and the parasitic inductance of the pin of the second terminal b is denoted as L2', so L1+L2>L1'+L2'.

In some embodiments, the length of the pin of the switch transistor 404 is smaller than the length of the pin of the synchronous rectification MOSFET 402, so that the parasitic inductance of the shorter pin of the switch transistor 404 is smaller than the parasitic inductance of the longer pin of the synchronous rectification MOSFET 402. Alternatively, the parasitic inductance of the pin of the switch transistor 404 is as small as possible or approximately equal to 0. For example, the parasitic inductance of the pin of the switch transistor 404 can be set to be smaller than a preset threshold, which may be a constant approximate to 0. In order to make the pin inductance as small as possible, the switch transistor 404 may be configured with no pins, and may be packaged in a manner with no pin; or the pin provided in the switch transistor 404 is smaller than a preset length so that the parasitic inductance value generated by the pin smaller than the preset length is less than the above preset threshold.

In some embodiments, the internal resistance R2 of the switch transistor 404 in this embodiment is also greater than the internal resistance R1 of the synchronous rectification MOSFET. Here, the switch transistor 404 in this embodiment is connected in parallel with the synchronous rectification MOSFET 402, where the larger the internal resistance in the parallel branch, the smaller the current flowing through it. As such, the internal resistance R2 of the switch transistor 404 may be set to be relatively large and at least greater than the internal resistance R1, so that the current flowing through the switch transistor 404 is relatively small, the heat loss is relatively less, and the influence of the parallel switch transistor 404 on the normal operation of the original synchronous rectification MOSFET 402 is reduced as much as possible.

Meanwhile, the controller 403 provided in this embodiment is configured to cause a turning-on and off of the switch transistor 404 and the synchronous rectification MOSFET 402 through the voltage across the switch transistor 404, wherein the controller may be an SR drive chip. For example, in the example as shown in FIG. 21, the SR drive chip 403 may be connected to the first terminal a of the switch transistor 404 through its CS pin, connected to the second terminal b of the switch transistor 404 through its GND pin, and connected to the third terminal c of the switch transistor 404 and the gate (G) of the synchronous rectification MOSFET simultaneously through its DRV pin.

More specifically, for the SR drive chip 403, in order to realize the control of the synchronous rectification MOSFET 402, it is necessary to detect the voltage value between the first terminal a and the second terminal b of the switch transistor 404, generate a control signal according to the detected voltage value, and then send the control signal to the third terminal c of the switch transistor 404 and the gate of the synchronous rectification MOSFET 402 simultaneously, so that the switch transistor 404 and the synchronous rectification MOSFET 402 are turned on or turned off simultaneously according to the control signal.

In the display apparatus provided in this embodiment, by adding a switch transistor connected in parallel with the synchronous rectification MOSFET of the rectifier circuit in the control circuit, since the parasitic inductance of the pins of the switch transistor is relatively small, the voltage across the switch transistor can reflect the voltage generated actually by the current flowing through the synchronous rectification MOSFET more accurately. Therefore, the controller can determine the voltage generated by the current flowing through the synchronous rectification MOSFET by detecting the voltage across the switch transistor, so as to counterbalance the effect of the parasitic inductance on the pins of the MOSFET on the voltage across the MOSFET when the voltage across the synchronous rectification MOSFET is directly detected.

Figure 22:
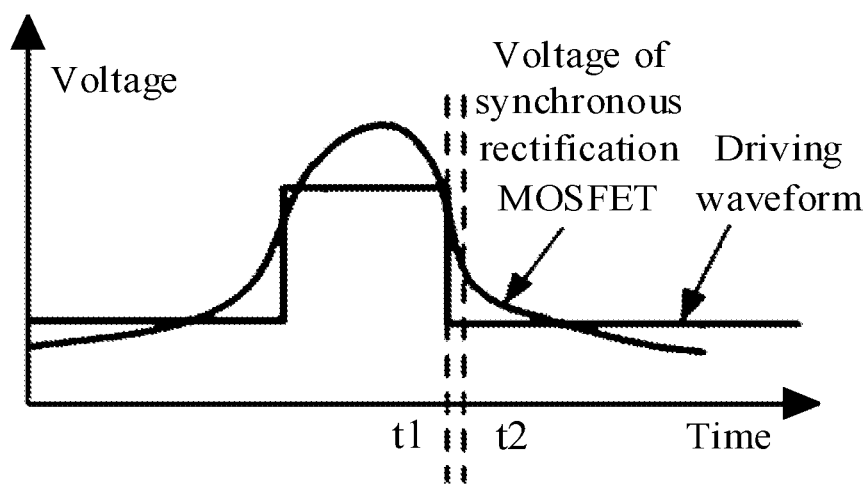
FIG. 22 is a schematic diagram of a control signal sent from the SR drive chip according to an embodiment.

For example, FIG. 22 is a schematic diagram of the control signal sent by the SR drive chip of the disclosure, wherein the voltage generated by the current flowing through the synchronous rectification MOSFET decreases from the peak, and a voltage drop will also be generated due to the parasitic inductance of the pin even when the current flows through the pin of the synchronous rectification MOSFET, causing the voltage across the pin of the synchronous rectification MOSFET to drop ahead of time. For the SR drive chip, the voltage generated actually by the current flowing through the synchronous rectification MOSFET may also be more accurately determined by detecting the voltage across the switch transistor. In response to determining at the moment t1 that the detected voltage is less than a preset threshold, a low-level control signal is sent to the synchronous rectification MOSFET to cause a turning-off between the source and drain of the synchronous rectification MOSFET2. Meanwhile, due to the small parasitic inductance of the pins of the switch transistor, the voltage across the switch transistor detected by the SR drive chip is more approximate to the actual voltage of the synchronous rectification MOSFET, so that the SR drive chip can generate the driving waveform as shown in FIG. 22 according to the more accurate voltage.

Comparing the driving waveform in FIG. 22 with the driving waveform in FIG. 20, the moment t1 is closer to t2 in FIG. 22. Under some ideal conditions such as the parasitic inductance of the pins of the switch transistor being 0, t1 may also be closer to t2 or even same as t2, thereby reducing the duration of heating caused by the parasitic diode inside the synchronous rectification MOSFET when it has been turned off between the moments t1 and t2, and thus reducing the loss of the synchronous rectification MOSFET.

Figure 23:
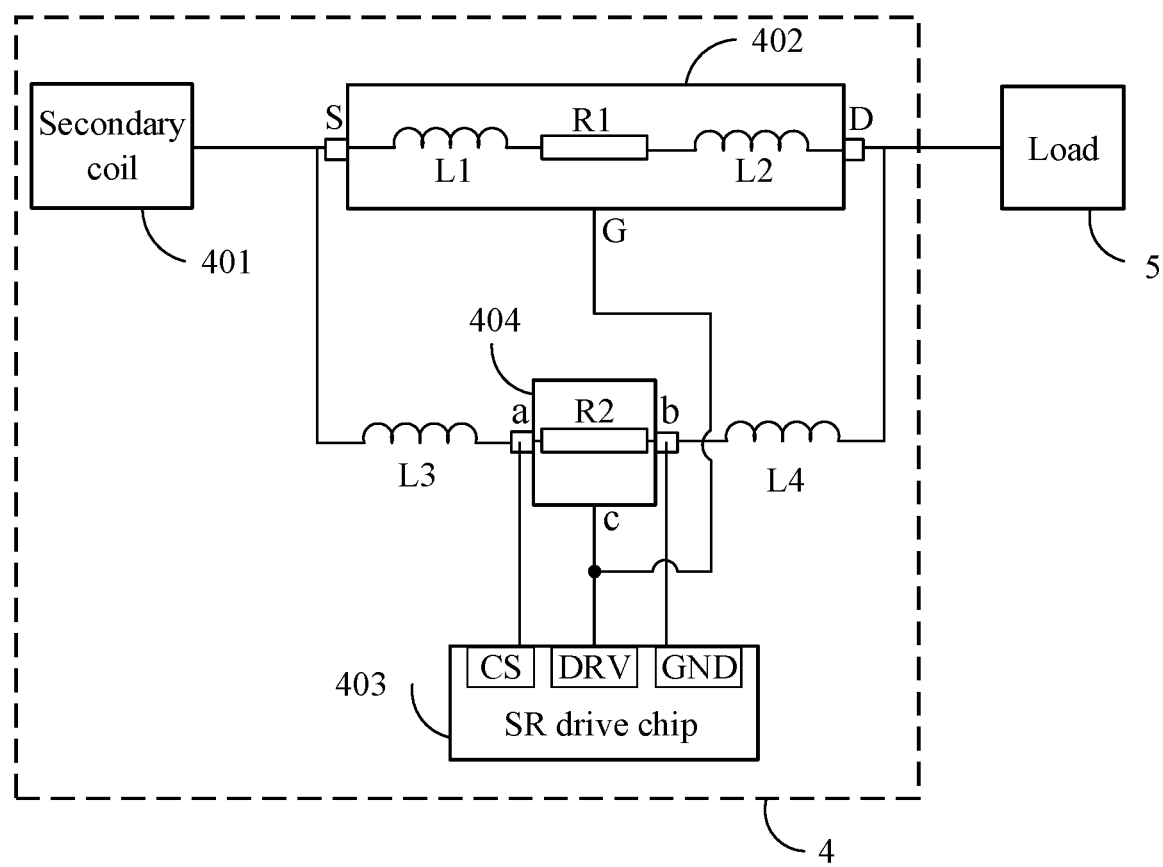
FIG. 23 is a structural schematic diagram of a control circuit according to another embodiment.

FIG. 23 is a structural schematic diagram of another embodiment of the control circuit according to the disclosure, wherein the control circuit as shown in FIG. 23 further includes, besides the components illustrated in the above embodiments, a first inductor L3 and a second inductor L4. The first terminal a of the switch transistor 404 is connected to the secondary coil 401 through the first inductor L3, and the second terminal b of the switch transistor 404 is connected to the load 5 through the second inductor L4.

In the embodiment shown in FIG. 23, assuming that the parasitic inductances of the pins of the synchronous rectification MOSFET 402 and the switch transistor 404 are both 0, the internal resistance of the synchronous rectification MOSFET 402 is R1, and the internal resistance of the switch transistor 404 is R2, then the currents I1 and I2 flowing through R1 and R2 have the following relationship: $I1*R1=I2*R2$, and the ratio of power loss in this case is $P1/P2=I1^2*R1/I2^2*R2=R2/R1$, so the internal resistance R2 of the switch transistor can ideally be selected according to the ratio of power loss.

However, since the parasitic inductances L1 and L2 of the pins of the synchronous rectification MOSFET 402 always exist, once the currents flowing through L1 and L2 change, the voltages generated by the parasitic inductance L1 and the parasitic inductance L2 will cause the current I2 flowing through R2 at this moment to change incompletely following the above formula $I1*R1=I2*R2$ but to become 0 a period of time before I1 falling to 0, reducing the accuracy of the voltage across the switch transistor 404 detected by the SR drive chip. Therefore, in the embodiment shown in FIG. 23, the first inductor L3 and the second inductor L4 are introduced on both sides of the switch transistor 404, and the sum of the inductance values L3+L4 is greater than the sum of L1+L2, so as to balance the current I2 flowing through R2, and prevent the current I2 flowing through R2 from changing incompletely according to the above formula $I1*R1=I2*R2$ in a manner similar to "balanced bridge".

In some embodiments, when the switch transistor is a surface mount MOS, the wire of the first terminal a of the switch transistor 404 may be extended to form the first inductor L3, or the wire of the second terminal b of the switch transistor 404 may be extended to form the second inductor L4. Alternatively, in some embodiments, the first inductor L3 and the second inductor L4 may also be wire winding inductors.

Figure 24:
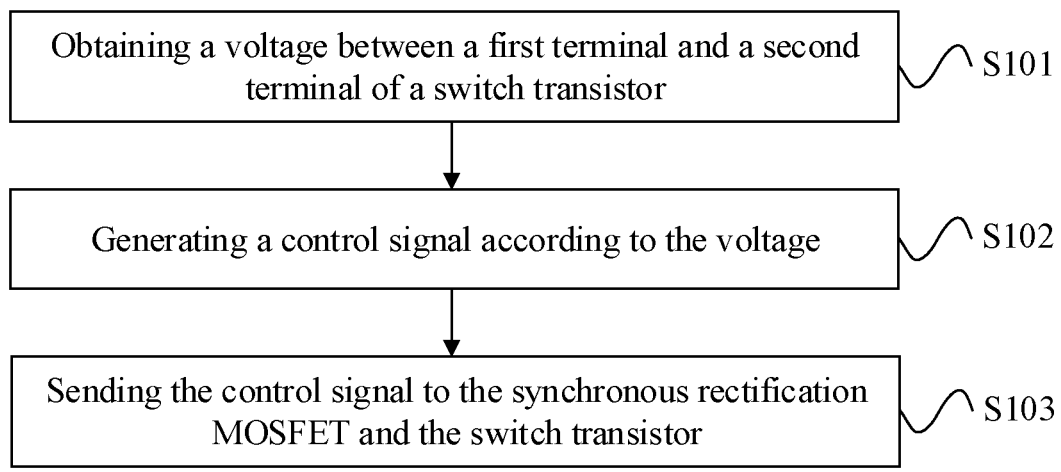
FIG. 24 is a schematic flowchart of a control method for a synchronous rectification MOSFET according to an embodiment.

The disclosure further provides a control method for a synchronous rectification MOSFET, which can be executed by the SR drive chip as shown in FIG. 21. For example, a control method for a synchronous rectification MOSFET shown in FIG. 24 includes the following.

S101: obtaining a voltage between a first terminal and a second terminal of a switch transistor; wherein the switch transistor is connected in parallel with the synchronous rectification MOSFET in a synchronous rectifier circuit, a source of the synchronous rectification MOSFET is connected to a secondary coil, a drain of the synchronous rectification MOSFET is connected to a load, the first terminal of the switch transistor is connected to the secondary coil, the second terminal is connected to the load, and a parasitic inductance of a pin of the switch transistor is smaller than a parasitic inductance of a pin of the synchronous rectification MOSFET.

S102: generating a control signal according to the voltage, wherein the control signal is used to control the synchronous rectification MOSFET and the switch transistor.

S103: sending the control signal to the synchronous rectification MOSFET and the switch transistor.

It can be understood by those ordinary skilled in the art that some or all of the steps of the above method embodiments may be performed by the hardware related to the instructions. The instructions may be stored in computer readable storage medium. When the instructions are executed, the steps included in the foregoing method embodiments are performed; and the foregoing storage medium includes various media that can store program codes, such as ROM, RAM, magnetic disk, or optical disk.

It should be noted that the above embodiments are only used to illustrate but not limit the disclosure; although the disclosure has been illustrated in details by reference to the above embodiments, it should be understood by those ordinary skilled in the art that they can still modify the above embodiments or substitute some or all of the elements; and these modifications and equivalents shall fall within the protection scope of the disclosure.

What is claimed is:

1. A display apparatus, comprising:
   a display screen configured for image display;
   a sound reproduction device configured to play sound;
   a power supply circuit configured to provide electric energy to a load of the display apparatus; and
   a controller;
   wherein the power supply circuit comprises:
      a rectifier circuit and a compensation circuit; wherein the rectifier circuit is configured to convert alternating current into direct current; and
      the compensation circuit is configured to compensate a parasitic signal of a synchronous rectification Metal-Oxide-Semiconductor Field Effect Transistor (MOSFET) in the rectifier circuit;
   wherein the rectifier circuit comprises a closed loop, wherein the closed loop includes a secondary coil, the synchronous rectification MOSFET and a load; and
   the compensation circuit comprises: an electromagnetic induction coil placed in the closed loop of the rectifier circuit; wherein the electromagnetic induction coil is configured to generate a compensation signal based on a closed loop current in the closed loop, wherein the compensation signal is used to compensate the parasitic signal of the synchronous rectification MOSFET in the rectifier circuit;

wherein the controller is configured to control the synchronous rectification MOSFET,
a source of the synchronous rectification MOSFET is connected with the secondary coil and a first terminal of the electromagnetic induction coil, a drain of the synchronous rectification MOSFET is connected with the load in the closed loop and the controller respectively: and a second terminal of the electromagnetic induction coil is connected with the controller;
the electromagnetic induction coil is configured to generate the compensation signal between the first terminal and the second terminal based on the closed loop current in the closed loop;
the controller is configured to generate a control signal for controlling the synchronous rectification MOSFET according to a voltage between the second terminal of the electromagnetic induction coil and the drain of the synchronous rectification MOSFET.

2. The display apparatus according to claim 1, wherein:
the controller comprises: a Synchronous Rectification (SR) drive chip with a CS pin, a GND pin and a DRV pin;
the CS pin of the SR drive chip is connected with the second terminal of the electromagnetic induction coil;
the GND pin of the SR drive chip is connected with the drain of the synchronous rectification MOSFET;
the DRV pin of the SR drive chip is connected with a gate of the synchronous rectification MOSFET.

3. The display apparatus according to claim 2, wherein the controller is further configured to:
in response to the control signal sent from the SR drive chip to the gate of the synchronous rectification MOSFET being a low-level signal, cause a turning-off between the source and the drain of the synchronous rectification MOSFET;
in response to the control signal sent from the SR drive chip to the gate of the synchronous rectification MOSFET being a high-level signal, cause a turning-on between the source and the drain of the synchronous rectification MOSFET.

4. The display apparatus according to claim 2, wherein:
the electromagnetic induction coil comprises at least one winding of wire.

5. The display apparatus according to claim 4, wherein:
the rectifier circuit and the compensation circuit are disposed on a single-sided PCB;
the electromagnetic induction coil is a piece of wire connecting between a pin of the controller and a pin of the synchronous rectification MOSFET.

6. The display apparatus according to claim 1, wherein:
the parasitic signal is generated by a parasitic inductance on a pin of the synchronous rectification MOSFET.

7. The display apparatus according to claim 6, wherein:
the parasitic signal and the compensation signal are voltage signals.

* * * * *